United States Patent [19]
Darnall et al.

[11] 3,911,654
[45] Oct. 14, 1975

[54] MACHINE FOR FORMING A COMPACT STACK OF CROP MATERIAL

[75] Inventors: David L. Darnall, Fresno; Gene R. Butler; Lee D. Butler, both of Kingsburg; Lester C. Barton, Fresno, all of Calif.

[73] Assignee: Sperry Rand Corporation, New Holland, Pa.

[22] Filed: Apr. 5, 1974

[21] Appl. No.: 458,270

[52] U.S. Cl. .................................. 56/350; 214/520
[51] Int. Cl.² ........................................ A01D 89/00
[58] Field of Search ......... 56/1, 345, 344, 346, 347, 56/348, 350; 214/518–522

[56] References Cited
UNITED STATES PATENTS

| | | | |
|---|---|---|---|
| 3,728,849 | 4/1973 | Lundahl | 56/1 |
| 3,840,134 | 10/1974 | Luscombe | 214/518 |

*Primary Examiner*—Russell R. Kinsey
*Attorney, Agent, or Firm*—John R. Flanagan; Frank A. Seemar; Joseph A. Brown

[57] ABSTRACT

A compact stack forming machine, having a mobile chassis adapted to move across a field, includes a pickup and conveyor system for continuously picking up crop material from the field and conveying the crop material to above, and from adjacent a first end toward an opposite second end of, a stack forming chamber mounted upon the chassis, an extensible and retractable flexible floor for progressively discharging crop material past a terminal end thereof and into the chamber so as to progressively form a stack of crop material in the chamber, a plurality of transversely spaced apart tine members pivotally mounted adjacent the terminal end of the floor for swinging movement across the chamber which causes lateral spreading of the discharging crop material, and a packing roll extending across the chamber and moveable between the ends thereof to compact the crop material discharged within the chamber as the stack is progressively formed in the chamber.

4 Claims, 24 Drawing Figures

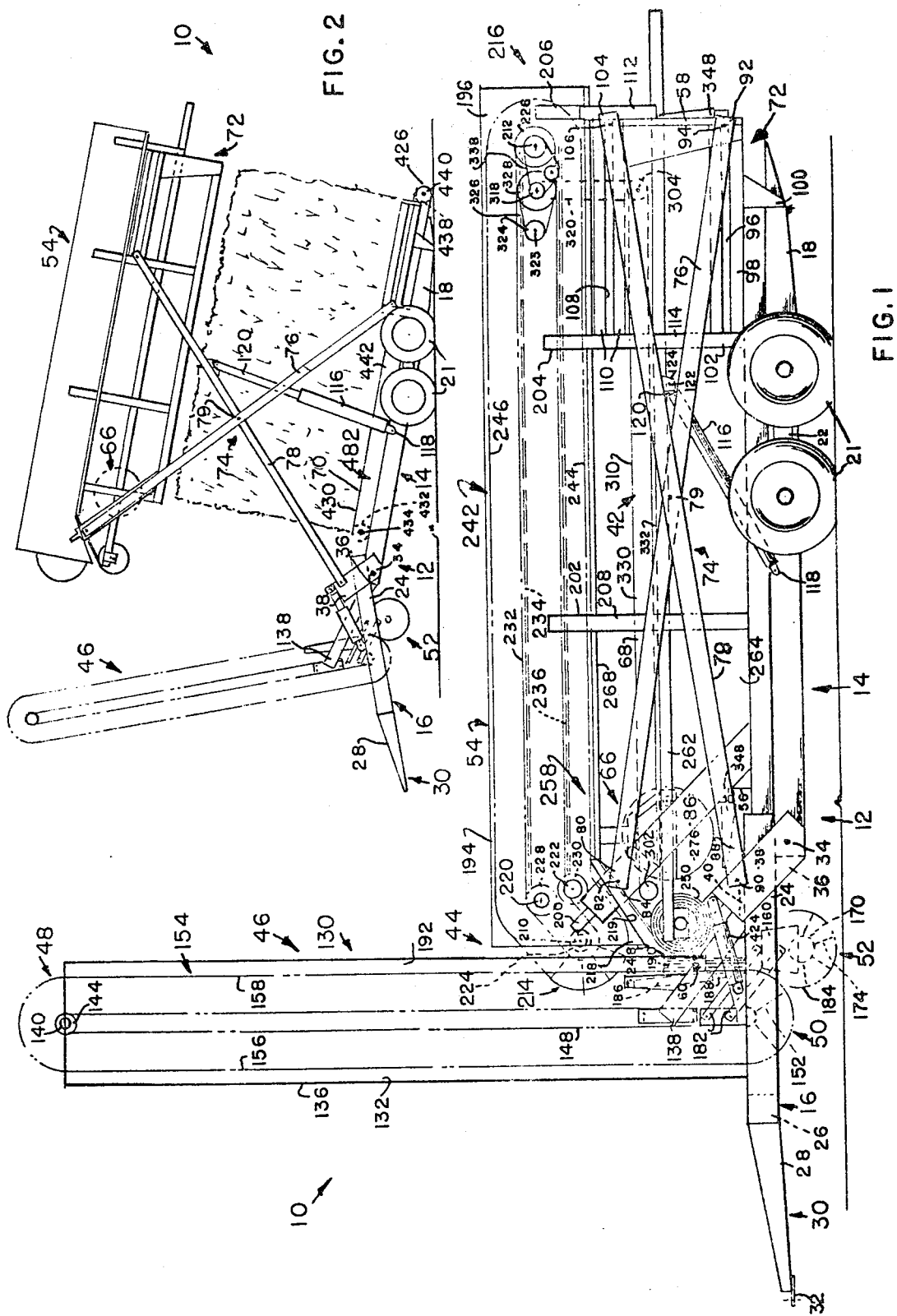

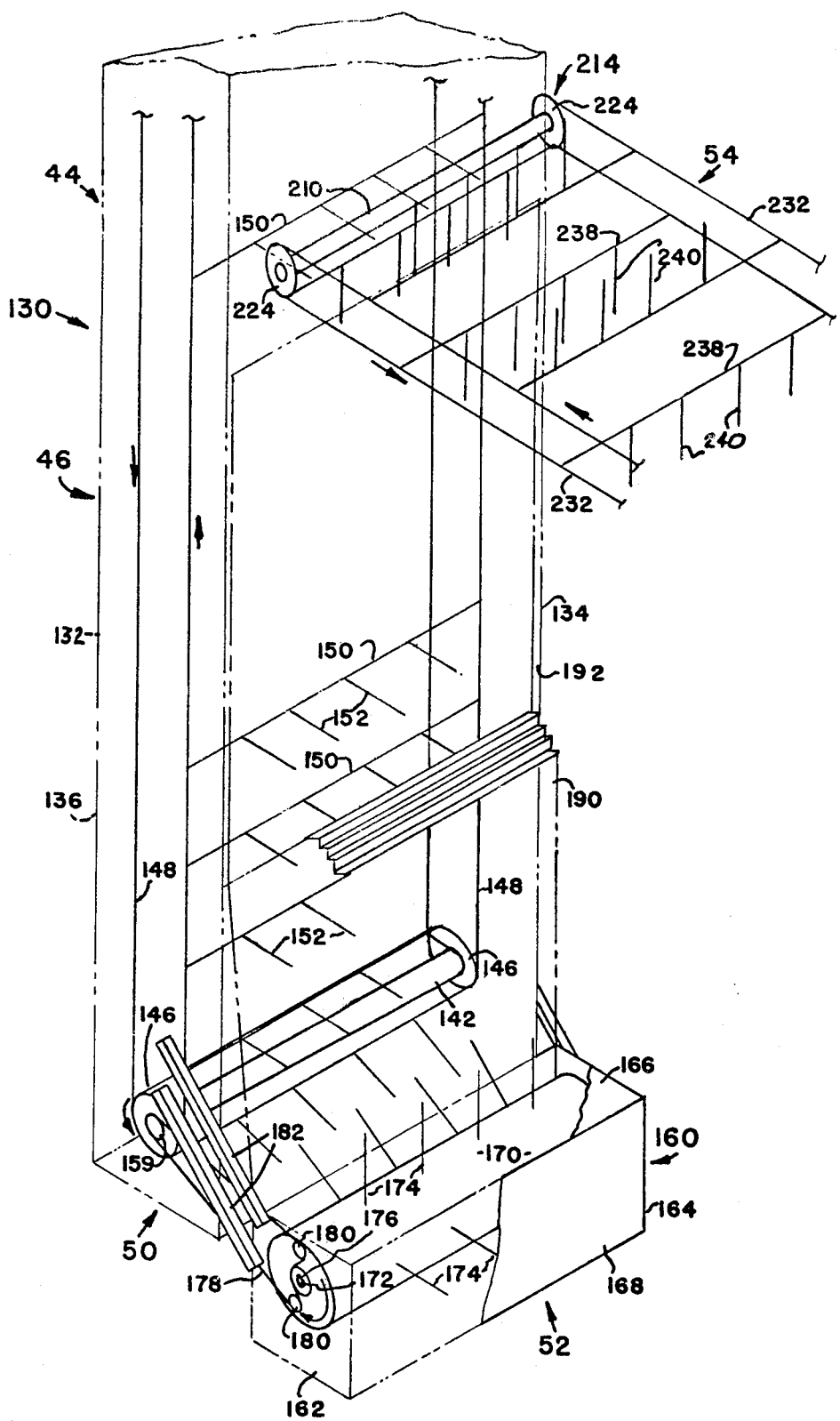

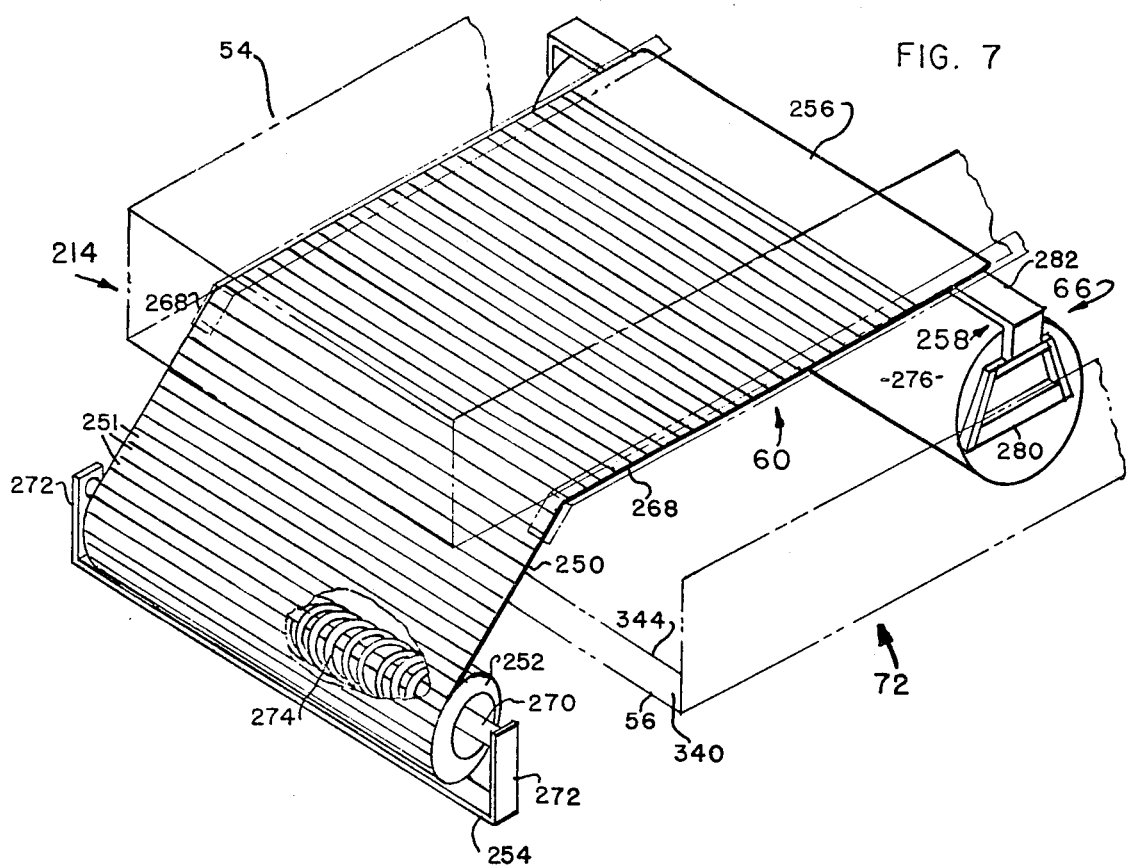
FIG. 7
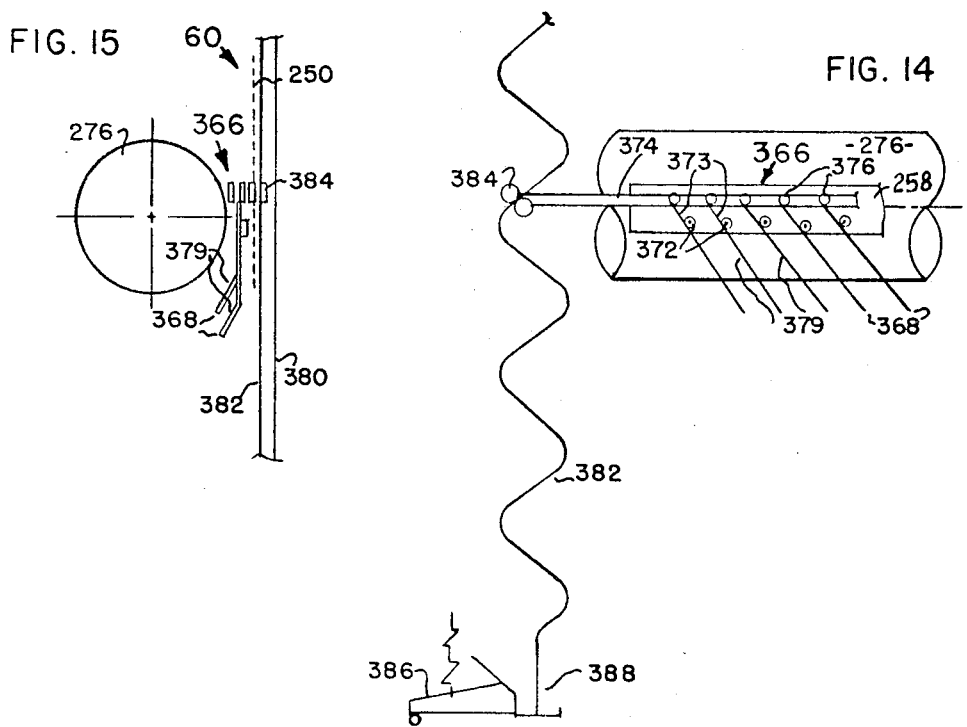
FIG. 15
FIG. 14

MACHINE FOR FORMING A COMPACT STACK OF CROP MATERIAL

CROSS REFERENCE TO RELATED APPLICATIONS

Reference is hereby made to the following co-pending U.S. applications dealing with related subject matter and assigned to the assignee of the present invention:

1. "Machine for Forming a Compact Stack of Crop Material" by Gene R. Butler et al., U.S. Ser. No. 458,260, filed Apr. 5, 1974.
2. "Machine for Forming a Compact Stack of Crop Material" by Gene R. Butler et al., U.S. Ser. No. 458,261, filed Apr. 5, 1974.
3. "Machine for Forming a Compact Stack of Crop Material" by Lee D. Butler et al., U.S. Ser. No. 458,265, filed Apr. 5, 1974.
4. "Method and Machine for Forming a Compact Stack of Crop Material" by Charles M. Kline et al., U.S. Ser. No. 458,266, filed Apr. 5, 1974.
5. "Machine for Forming a Compact Stack of Crop Material" by James R. Koop et al., U.S. Ser. No. 458,267, filed Apr. 5, 1974.

BACKGROUND OF THE INVENTION 1. 1. Field of the Invention

The present invention relates generally to the art of harvesting loose crop material and, more particularly, is concerned with a machine for continuously picking up crop material such as loose hay or the like and progressively forming the crop material into a large, compact stack.

2. Description of the Prior Art

For many years now, the predominate method of harvesting loose crop material such as hay or the like in the United States and many other countries has been to continuously pick up the previously cut and windrowed hay and form it into small wire- or twine-tied rectangular bales with an automatic baler, the bales normally ranging in weight from approximately 50 to 125 pounds.

Over the years, the automatic baler method of harvesting hay has usually necessitated the assistance of a crew of persons, in addition to the baler operator, in handling and storing the bales. In recent years, the availability of hay harvesting labor has become more scarce and labor costs have steadily risen. However, the impact of these unfavorable conditions on the popularity of the automatic baler method has been greatly minimized during the past decade by the introduction and growing commercial acceptance of the automatic bale wagon, which was originally illustrated and described in U.S. Pat. No. 2,848,127 and more recently, for example, in U.S. Pat. No. 3,502,230. In many parts of the United States, the automatic baler method has been largely integrated into a completely automatic hay harvesting and handling system by the aforementioned bale wagon which is believed to have assured the continued, widespread viability and soundness of the automatic baler method of harvesting hay.

However, even in view of the widespread acceptance of the automatic baler method and the growing acceptance of the automatic bale wagon, other alternative methods of harvesting hay have periodically been proposed and introduced over the years.

One alternate method recently introduced utilizes a stack forming machine which picks up loose windrowed hay or the like and forms it into a large, compact stack, the stack normally ranging in weight from approximately three to 6 tons. This compact stack forming method of harvesting loose hay has been realizing considerable commercial acceptance in the central and northern plain states region of the United States. In this region of the country, because of a variety of factors, some of which are climatic and terrain conditions and traditional ranching and stock feeding practices, crop material such as hay or the like has been traditionally harvested by gathering and building the hay in loose form into large stacks.

One type of commercial compact stack forming machine is illustrated and described in U.S. Pat. Nos. 3,556,327, 3,691,741, 3,732,672 and 3,733,798 and has a stack forming body into which loose crop material is blown and built into a stack with the body vertically reciprocably mounting a compression roof for periodically compacting the stack.

Another type of commercial compact stack forming machine is illustrated and described in U.S. Pat. No. 3,720,052 and has a rotating stack forming platform onto which loose crop material is conveyed and a packing drum which rolls against the stack as the platform and stack rotate to compact the stack as it is being formed on the platform.

Various other proposed types of compact stack forming machines are illustrated and described in the prior art. For example, U.S. Pat. Nos. 3,691,742, 3,728,849, 3,744,228, and 3,768,679 disclose machines which also have stack forming bodies with various types of vertically movable compression devices for compacting the stack being formed in the body. In addition, U.S. Pat. No. 3,751,892 discloses a machine which also has a stack forming body and utilizes a horizontally movable compression wall member for compacting the stack being formed in the body. Still further, German Pat. No. 1,101,170 and Argentine Pat. No. 167,422 disclose machines which utilize packing rolls for compacting a stack of crop material being formed on a platform of the machine.

SUMMARY OF THE INVENTION

The present invention broadly comprises, in a machine for forming a compact stack of crop material such as hay or the like, the combination of a mobile chassis adapted to move across a field, a stack forming chamber mounted upon the chassis, means for continuously delivering crop material from the field to above the chamber and from adjacent a first end of the chamber toward an opposite second end of the chamber, means for progressively discharging the crop material into the chamber, means for spreading the crop material across the chamber, packing means extending across the chamber and moveable between the ends thereof to compact the crop material discharged within the chamber as the stack is progressively formed in the chamber, and means for continuously moving the packing means between the ends of the chamber.

More particularly, the discharging means progressively discharges the crop material into the chamber from the opposite second end to the first end of the chamber and the spreading means continuously spreads the crop material as it is discharging into the chamber.

Further, more particularly, the discharging means progressively discharges the crop material into the chamber along a longitudinal central portion of the chamber from the opposite second end to the first end of the chamber and the spreading means continuously spreads the discharging crop material so as to achieve even lateral distribution thereof between the ends of the chamber. Then, when the compact stack has been substantially formed to a desired height, means provided for discontinuing the operation of the spreading means is actuated to allow final quantities of the discharging crop material to accumulate and be compacted along the longitudinal central portion of the stack which thereby provides the stack with a longitudinally extending rounded off top.

Still more particularly, the discharging means comprises means extensible from adjacent the first end to adjacent the opposite second end of the chamber as the packing means is correspondingly so moved and retractable from adjacent the opposite second end to the first end of the chamber as the packing means is correspondingly so moved, the extensible and retractable means allowing progressive discharge of crop material past a terminal end thereof and into the chamber during its retraction from the opposite second end to the first end of the chamber. The spreading means is associated with the terminal end of the extensible and retractable means such that spreading of the crop material is performed upon discharge of the crop material past the terminal end and into the chamber.

Still further, the spreading means comprises a plurality of transversely spaced apart tine members pivotally mounted adjacent the terminal end of the extensible and retractable means for swinging movement across the chamber and extending for a short distance beyond the terminal end and toward the opposite second end of the chamber, and means for causing pivotal swinging movement of the tines as the extensible and retractable means so extends and retracts between the ends of the chamber as the packing means is correspondingly moved between the ends of the chamber.

The machine of the present invention provides for continuous, non-stop pickup and compaction of crop material into the form of a compact stack. The mode of discharging additional crop material onto previously discharged and compacted crop material of the stack being formed in the chamber and the mode of laterally spreading the discharging crop material facilitates the continuous smooth delivery of crop material from the field to the stack and simultaneously therewith, continuous progressive compaction of the crop material without uneven material build up on the stack or interference with the operation of the packing means.

BRIEF DESCRIPTION OF THE DRAWINGS

In the course of the following detailed description reference will be frequently made to the attached drawings in which:

FIG. 1 is a side elevational view of a compact stack forming machine embodying the principles of the present invention;

FIG. 2 is another side elevational view of the machine, on a smaller scale than that of FIG. 1, showing the machine in its position for unloading a completed compact stack of crop material;

FIG. 4 is a fragmentary schematic representation of the pickup and conveying system of the machine of FIG. 1;

FIG. 7 is a schematic representation of the extensible and retractable flexible floor having its terminal end coupled to the carriage of the packing roll;

FIG. 14 is a top plan schematic representation of the spreading mechanism of FIG. 13;

FIG. 15 is a side elevational schematic representation of the spreading mechanism of FIG. 13;

DETAILED DESCRIPTION OF THE INVENTION

In the following description, right hand and left hand references are determined by standing at the rear of the machine and facing in the direction of forward travel. Also, in the following description, it is to be understood that such terms as "forward," "rearward," "left," "upwardly," etc., are words of convenience and are not to be construed as limiting terms.

IN GENERAL

Figure 3:
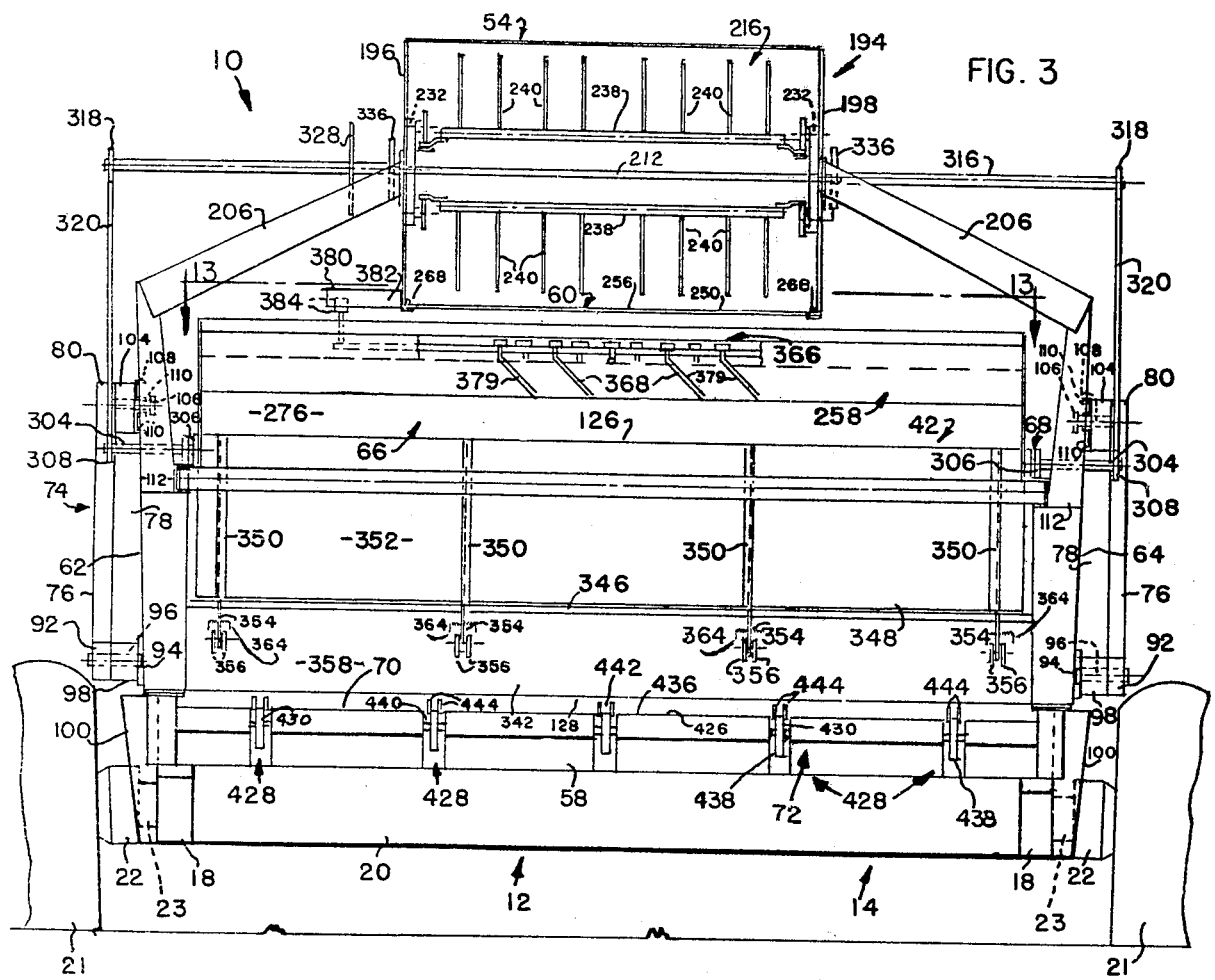
FIG. 3 is a rear elevational view of the machine on a larger scale than that of FIG. 1.
Figure 13:
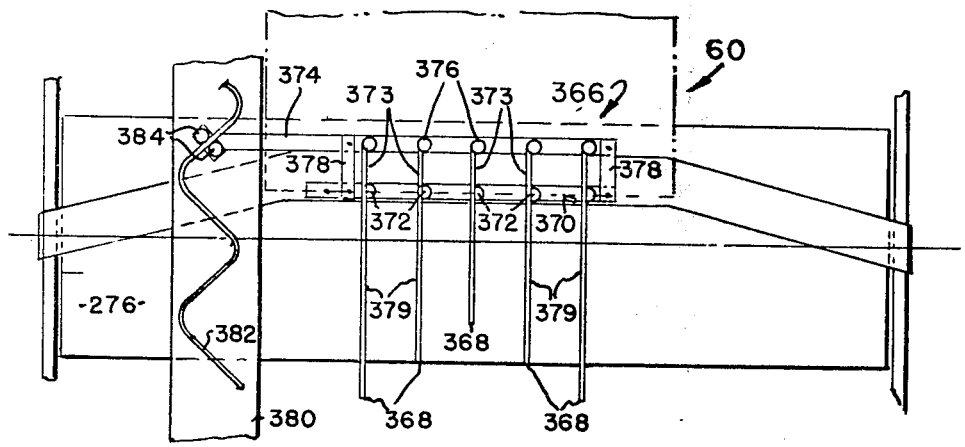
FIG. 13 is a fragmentary top plan view taken along line 13—13 of FIG. 3 showing a mechanism mounted on the carriage of the packing roll which may be used for evenly laterally spreading crop material being discharged from the terminal end of the flexible floor into the chamber.

Referring now to the drawings, and particularly to FIGS. 1 through 3, there is shown a machine for forming a compact stack of crop material such as hay or the like, the machine being indicated generally by numeral, 10 and forming the preferred embodiment of the present invention (the left side of the machine being shown in FIG. 1 when one is standing to the rear of the machine as shown in FIG. 3 and facing in the direction of forward travel).

The machine 10 is provided with a mobile chassis, generally indicated at 12, which is formed in two sections including a main frame 14 and a hitch frame 16. The main frame 14 is formed of left and right longitudinally extending rails 18 and transverse rails 20, of which only the rear rail is shown in FIG. 3, which interconnects the longitudinal rails 18. Each of the longitudinal rails 18 is supported by a pair of tandemly arranged wheels 21 being mounted on a common member 22 which is, in turn, pivotally journalled to a stub shaft 23 extending from the outer side of each longitudinal rail 18. The hitch frame 16 is formed of left and right longitudinally extending side members 24 of which only the left side member 24 is shown and forward and rear cross members 26, of which only the forward cross member 26 is shown, which interconnects the side members 24. A pair of short beams 28 (of which only the left one is shown) are fixed to an intermediate portion of the forward cross member 26 and convergently extend forwardly therefrom and merge together at their forward ends to from a tongue, generally indicated 30, having a hitch element 32 fixed thereon which adapts the mobile chassis 12 to be secured to a tractor, or other towing vehicle, located at the front thereof.

The main frame 14 and the hitch frame 16 are pivotally mounted together at a location, generally designated at 34, at each side of the chassis 12 where the corresponding adjacent ends of the respective left and right rails 18 and of the respective left and right side members 24 overlap each other to a substantial extent. A pair of spaced apart plates 36 (of which only the outer one is shown on the left side of the machine) are fixed to the underside of each of the side members 24 near to, but spaced from, the rear end of each side member 24, extend downwardly therefrom and within the forward end of each rail 18, and are pivotally coupled to the forward end of each rail 18 by a fastening means (not shown) at location 34. Further, another pair of spaced apart plates 38 (of which only the outermost one is shown on the left side of the machine) are respectively fixed to the sides of the forward end of each rail 18 and extend therefrom upwardly and forwardly at an acute angle to the longitudinal extent of each rail 18 past the respective sides of each side member 24. Above each side member 24, each pair of plates 38 are interconnected by a horizontal cross plate 40 being fixed thereto which, concurrently with the overlapping engagement of the underside of the rear end of each side member 24 with the upperside of each rail 18 when the main and hitch frames 14, 16 are in their normal horizontal positions as shown in FIG. 1, engages the upperside of each side member 24 whereby the weight of the machine 10 at the region of overlap between main and hitch frames 14, 16, when the machine is hitched to a tractor, is supported by the respective aforementioned concurrently engaging ports and, thus, is not imposed upon the fastening element which pivotably couples the main and hitch frames 14, 16 together.

Also, the machine 10 is provided with a stack forming chamber, generally indicated by numeral 42, being mounted on the main frame 14 of the chassis 12. A crop material delivery means, such as pickup and conveying system, generally indicated by numeral 44, is provided in the machine 10 which system 44 includes an upright elevator 46 being mounted on the hitch frame 16 forwardly of the chamber 42 and having an upper end 48 extending substantially higher than the chamber 42 and a lower end 50 located adjacent the field which mounts a pickup 52. The system 44 further includes a horizontal conveyor 54 being mounted to the main frame 14 of the chassis 12 and positioned above the chamber 42 to extend from adjacent the elevator 46 and a first or front end 56 of the chamber 42 to adjacent an opposite second or rear end 58 of the chamber 42.

As the mobile chassis 12 of the machine 10 is moved across the field with the machine being in operating condition, the pickup and conveying system 44 continuously picks up windrowed crop material from the field and conveys the crop material to above the chamber 42 and from adjacent the first end 56 thereof toward the opposite second end 58 thereof.

A discharging mechanism, generally designated 60 and more clearly seen in FIG. 7, is provided in the machine below the horizontal conveyor 54 and above the chamber 42 for progressively discharging the crop material, being continuously conveyed toward the opposite second chamber end 58, into the chamber 42 so as to progressively form a stack of crop material in the chamber 42. Extending transversely across the chamber 42 between left and right sides 62, 64 thereof is a packing means, generally indicated 66, which is continuously moved by moving means, generally designated 68, between the first and second chamber ends 56, 58 to compact the crop material discharged within the chamber 42 as the stack is progressively formed therein.

STACK FORMING CHAMBER

Figure 6:
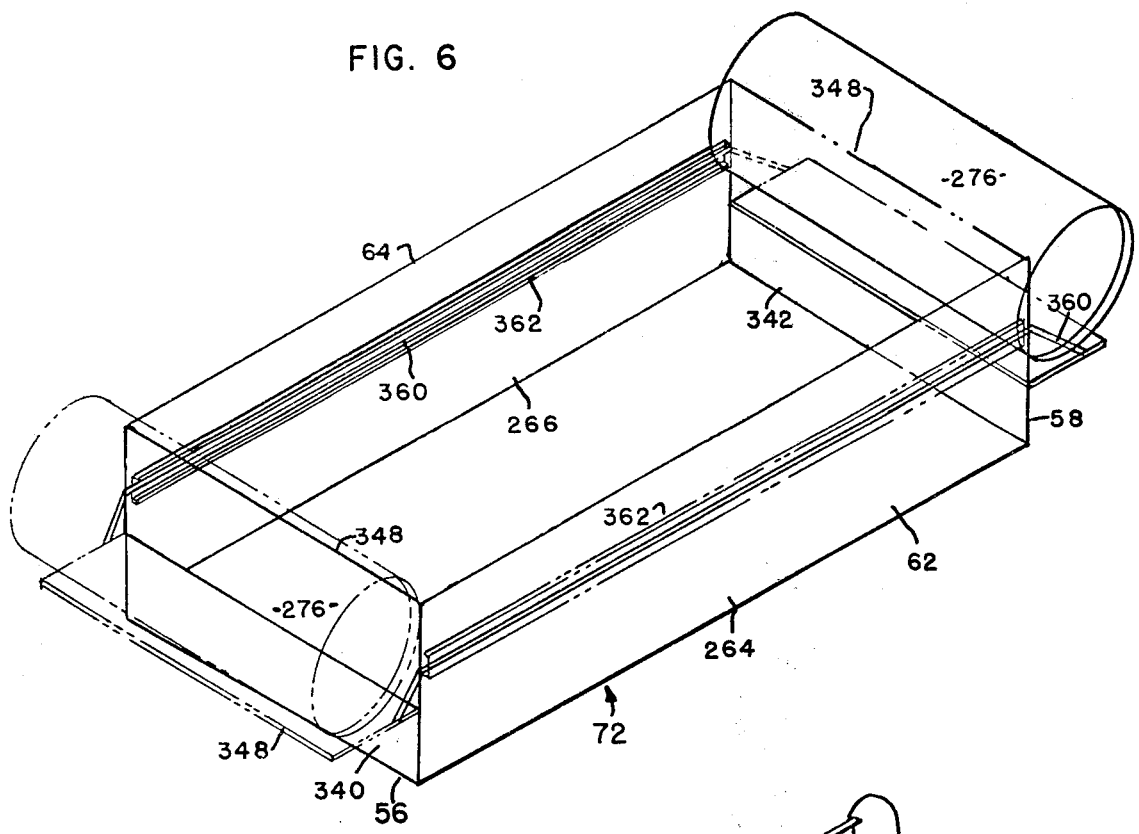
FIG. 6 is another fragmentary schematic representation of a second form of the enclosure (having the mounting tracks but such tracks being omitted for purpose of clarity), which now has an interconnected pair of pivotal end gates at the ends of the enclosure, showing the manner in which the roll actuates the end gates when the roll (being mounted by the carriage but the carriage also being omitted for purpose of clarity) has moved to the first end of the enclosure (as represented in broken line) and has moved to the opposite second end of the enclosure (as represented in solid line)
Figure 5:
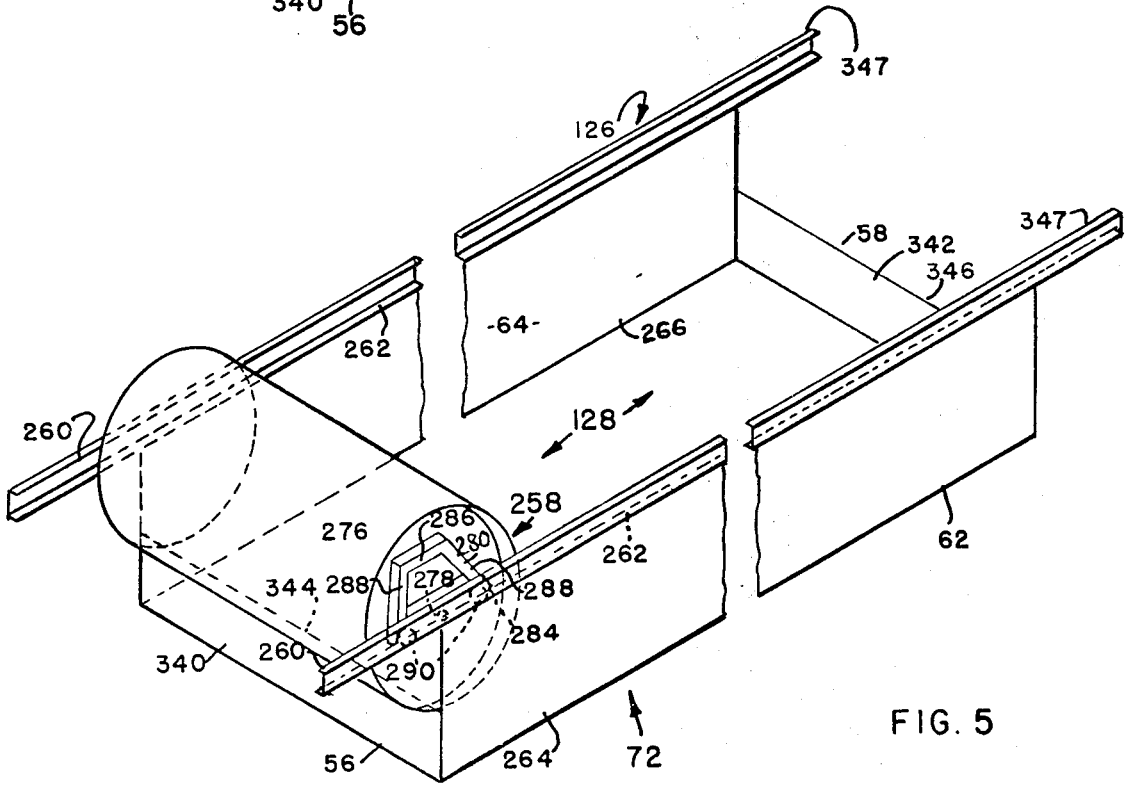
FIG. 5 is a fragmentary schematic representation of the cylindrical packing roll extending across, and positioned at the first end of, one form of the enclosure of the stack forming chamber of the machine, showing the roll mountably coupled at its opposite ends by a carriage which runs along and within tracks provided on the opposing sides of the enclosure for movement between the first end and an opposite second end of the enclosure.

The stack forming chamber 42 includes a generally rectangular crop material receiving platform 70 mounted on the base frame 14 of the chassis 12 between the longitudinal rails 18 and a generally rectangular enclosure 72, as more clearly seen in FIGS. 5 and 6, supported above the platform 70 by mounting means, generally indicated 74, taking the form of a pair of respective forwardly inclined and rearwardly inclined lift legs 76, 78 which cross and are pivotally secured to each other at point 79 and are disposed on each of the left and right sides 62, 64 of the chamber 42.

An upper forward end 80 of each forwardly inclined lift leg 76 is pivotally mounted at point 82 to an upper end 84 of a forwardly slanting front post 86 being fixed to each side 62, 64 of the enclosure 72 adjacent to first end 56. A lower forward end 88 of each rearwardly inclined lift leg 78 is pivotally mounted at point 90 to the outermost one of the pair of spaced apart plates 38 just above the location of interconnection of the plates 38 by the cross plate 40. A lower rearward end 92 of each forwardly inclined lift leg 76 is pivotally journalled at 94 to, and simultaneously slideable along a horizontally extending slot 96 defined within, a lower guide plate 98 secured by a bracket 100 to each longitudinal rail 18 and also secured to another bracket 102 being fixed to each longitudinal rail 18. An upper rearward end 104 of each rearwardly inclined lift leg 78 is pivotally journalled at 106 to, and simultaneously slideable along a horizontally extending slot 108 defined between, an upper part of parallel, spaced apart guide members 110 secured between a vertical rear post 112 being fixed to each side 62, 64 of the enclosure 72 adjacent its second end 58 and a vertical intermediate post 114 being also fixed to each side 62, 64 of the enclosure 72 but spaced forwardly from the rear post 112 and the second end 58 of the enclosure 72.

Thus, while the pivot points 82, 90 of the respective upper and lower forward ends 80, 88 of the forwardly and rearwardly inclined lift legs 76, 78 are statically positioned with respect to the enclosure 72 and the platform 70 of the chamber 42, respectively, the points of simultaneous pivotal journalling and sliding movement 94, 106 of the respective lower and upper rearward ends 92, 104 of the same forwardly and rearwardly inclined lift legs 76, 78 are not so statically positioned with respect to the enclosure 72 and the platform 70 of the chamber 42, respectively, but instead are moveable between the rearward and forward ends of the slots 96, 108. Such sliding movement facilitates the pivotal scissoring movement of the lift legs 76, 78 between their folded, crossed position of FIG. 1 and their unfolded, crossed position of FIG. 2 as is caused and controlled by selected actuation through suitable hydraulic controls (not shown) of a hydraulic cylinder 116 being pivotally mounted at its lower end at point 118 to each longitudinal rail 18 and pivotal at the terminal end of its piston rod 120 at point 122 to a bracket 124 secured to each rearwardly inclined lift leg 78.

Figure 17:
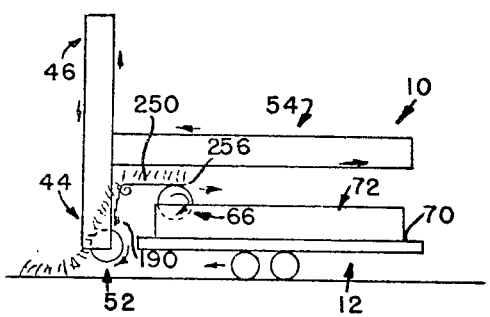
FIGS. 17 through 24 are schematic representations of the machine of FIG. 1 showing the operations of the machine, as it is moved across a field, in continuously picking up crop material and forming a compact stack of the crop material.

The enclosure 72 is open at both its top and bottom, being generally designated by numerals 126, 128. The platform 70 provides a bottom for the enclosure 72 when the machine 10 is set up as shown in FIGS. 1 and 17, for the commencement of the formation of a stack in the chamber 42. However, as the stack is being formed during which process it progressively grows in height, selected actuation (extension) of the hydraulic cylinder 116 unfolds the lift legs 76, 78 and elevates, or vertically displaces, the enclosure 72 from the platform 70 and, in this manner, maintains the enclosure 72 positioned about an upper portion of the stack, as is schematically illustrated in FIGS. 21 to 24. In being so maintained about the upper stack portion, the enclosure 72 provides lateral support therefor which facilitates the continuous compaction of additional loose crop material onto the upper portion of the stack by the packing means 66 as will be explained in detail hereinafter. It has been found in the present invention that it is not necessary to provide lateral support for the entire stack in order to form a compact stack having acceptable integrity. Furthermore the benefits to be gained by the provision of what might be called "abbreviated sidewalls" for the stack forming chamber 42, which have already been mentioned, will again be discussed in the description of the operations of unloading and retrieving the completed stack from and by the machine 10. Also, other structural features of the platform 70 and the enclosure 72 and their importance will be described and become apparent in connection with the description of other parts of the machine 10 which follows hereinafter.

CROP MATERIAL DELIVERY MEANS

The elevator 46 of the pickup and conveying system 44 includes an elongated housing 130 comprised by left and right sidewalls 132, 134 and front wall 136. The elevator 46 is open at its bottom and top and at its back facing the first end 56 of the chamber 42 and is mounted in an upright position with respect to the hitch frame 16 by a pair of support arms 138 (only the left of which is shown) which are fixed at their lower ends to the rear cross member (not shown) of the hitch frame 16, extend therefrom forwardly at an approximately 45 degree angle to the hitch frame 16 and are fixed at their upper ends to the opposite sidewalls 132, 134 of the elevator 46.

As more clearly schematically shown in FIG. 4, the elevator 46 has shafts 140, 142 rotatably mounted between the sidewalls 132, 134 respectively at the upper and lower ends 48, 50 of the elevator 46. At the upper end 48 of the elevator 46 each opposite end of the shaft 140 has a driven sprocket 144 fixed thereto inside the housing 130. A suitable source of motive power, such as a hydraulic motor (not shown), is mounted to the upper end 48 of the elevator housing 130 and operatively coupled to one of the sprockets 144 for drivingly rotating the sprockets 144 upon actuation of suitable remote controls (not shown) operatively connected with the hydraulic motor. At the lower end 50 of the elevator 46 each opposite end of the shaft 142 has an idler sprocket 146 fixed thereto inside the housing 130. An endless link chain 148 extends between and over the pair of driven and idler sprockets 144, 146 along each of the sidewalls 132, 134 of the elevator 46 inside the housing 130. An endless series of tine bars 150 extend transversely between, and are suitably connected at their opposing ends to, the chains 148 at regularly spaced intervals and each have a row of spaced apart outwardly projecting tines 152 mounted thereon. The tips of the tines 152 traverse path 154, as shown in FIG. 1, with the tines 152 moving downwardly on a front course 156 of the path 154 and upwardly on a rear course 158 of the path 154. Also, the end of the lower shaft 142 extends through the housing sidewall 132 and fixedly mounts a drive sprocket 159, having a smaller diameter than the idler sprocket 146 adjacently positioned thereto within the housing 130.

The pickup 52 of the pickup and conveying system 44 includes a housing 160 comprised by left and right sidewalls 162, 164 and top and back walls 166, 168. The housing 160 is open at its bottom and front and has a tubular member 170 rotatably mounted between its sidewalls 162, 164 by end shafts 172 which extend from opposing ends of the member 170 and through the sidewalls 162, 164. The tubular member 170 has a plurality of pickup tines 174 mounted thereon at staggered spaced apart locations about the circumference of the member 170 which extends radially outwardly with respect to the longitudinal rotational axis of member 170.

The end of shaft 172 of the tubular member 170 extends through the housing sidewall 162 and fixedly mounts a driven sprocket 176. An endless drive chain 178 extends between and over drive and driven sprockets 159, 176 respectively of the elevator 46 and pickup 32 located along the sidewalls 132, 162 of the elevator 46 and pickup 52 respectively. Also, the drive chain 178 extends over a pair of idler sprockets 180 mounted adjacently above and below each of the driven sprockets 176 of the pickup 52 so that the rotation of the tubular pickup member 170 will be opposite to that of the lower shaft 142 of the elevator 46. The idler sprockets 180 may be adjusted to improve a desired level of tension on the drive chain 178.

The pickup 52 is located below and rearwardly of the lower end 50 of the elevator 46 and supported thereon by a pair of parallel link bars 182 interconnecting each of the corresponding sidewalls 132, 162 and 134, 164 of the elevator 46 and pickup 52. Each link bar 182 is pivotably mounted at its opposite ends on the respective sidewalls whereby the overall four-bar linkage suspension system supports the pickup 52 from the elevator 46 in such a manner that the pickup 52, when in its lower operating position, will float on the field surface, being supported thereon by a skid shoe (not shown) attached to its sidewalls 162, 164. Therefore, even though uneven terrain may be encountered this will not affect the operation of the pickup 52 since the motion of the center line or rotational axis of the pickup shafts 172 is in an arc having a constant radius about the center line or rotational axis of the lower shaft 142 of the elevator 46. This suspension system keeps path 184 traversed by the tips of the pickup tines 174 in a constant merging or overlapping relationship with the path 154 traversed by the elevator tines 152 as the latter pass around the lower elevator end 50 and as the pickup 52 floats on the field surface. Further since such constant relationship may be maintained by utilizing such suspension system, the pickup 52 can be driven directly from the elevator 46 as theretofore described by drain chain 178.

With the pickup 52 so located below and rearwardly of the lower elevator end 50, windrowed hay lying on the field is gently moved and lifted by the pickup 52 through one streamlined 90 degree bend directly vertically into the path 154 of the elevator tines 152 which then continue to vertically lift and move the hay. Also, it is readily apparent that after the hay is received by the elevator tines along the path 154, the path 184 of the pickup tines 174 diverges therefrom such that the tines 174 became automatically removed from the vertically elevating hay.

In order to pivotally move the pickup 52 between its lower field or operating position as shown in FIG. 1 and an upper transport portion (not shown), a hydraulic cylinder 186, being pivotally mounted at its upper end to each of the sidewalls 132, 134 of the elevator 46 and at a terminal end of its piston rod 188 to each of the sidewalls 162, 164 of the pickup 52, may be selectively actuated through suitable hydraulic controls (not shown).

As shown in FIG. 1, and more clearly in FIG. 4, a plurality of telescoping doors or partitions 190 are slideably mounted between, and guided within, vertical facing channels 192 formed along the opposing vertical, rearward edges of the elevator sidewalls 132, 134.

While the elevator 46 is normally open at its back, the doors 190 are successively slid vertically to positions one above the next to progressively close the back of the elevator 46 as the horizontal conveyor 54 of the pickup and conveying system 44 and the enclosure 72 of the stack forming chamber 42 are vertically displaced relative to the crop receiving platform 70 as the compact stack progressively grows in height during its formation. The manner of connection between the doors 190 and the horizontal conveyor 54 will be described in further detail hereinafter.

The horizontal conveyor 54 of the pickup and conveying system 44 includes an elongated housing 194 comprised by left and right sidewalls 196, 198 being interconnected at various spaced locations (not shown) along the middle of the sides by cross members (not shown) and at the rear end of the conveyor 54 adjacent the second end of the chamber 42 by a screen (not shown). The bottom and front of the housing 194 are substantially open and the top thereof may be either open or closed by a wall as desire. The conveyor 54 is mounted in its horizontal position above the enclosure 72, and extending from forwardly of the first end 56 of the enclosure 72 to rearwardly of the second end 58 of the enclosure 72, by pairs of longitudinally spaced apart extensions 200, 202, 204 and 206 being at their outer ends fixed respectively to the corresponding upper ends of the pair of front slanting posts 86, a pair of forwardly intermediate vertical posts 208, the pair of rearwardly intermediate vertical posts 114 and the pair of rear vertical posts 112, the extensions projecting therefrom respectively inwardly and upwardly toward, and at an approximate 45° angle to, a vertical plane through the longitudinal centerline of the chamber 42, and being at their inner ends fixed to the housing 194 on the corresponding one of each of the left and right sidewalls 196, 198 thereof. Through the aforementioned mounting arrangement, the conveyor 54 through its housing 194 is fixed in a constant positional relationship to the enclosure 72 and the two are moved as a unit vertically toward, or away from, the platform 70 by the forwardly and rearwardly inclined lift legs 76, 78 upon selected actuation of the hydraulic cylinders 116 to either fold, or unfold, the lift legs 76, 78.

The conveyor 54 has shafts 210, 212 respectively rotatably mounted between the sidewalls 196, 198 at the forward and rearward ends 214, 216 of the conveyor 54. At the forward end 214 of the conveyor 54, the housing sidewalls 196, 198 respectively have downwardly projecting portions 218 being interconnected along their respective lower rearwardly-inclined edges by a bottom wall 219 and the forward end shaft 210 is mounted in a horizontal plane spaced below that within which the rearward end shaft 212 is mounted. Two additional upper and lower shafts 220, 222 are fixedly mounted between the sidewalls 196, 198 near the forward housing end 214. At each opposite end of the forward end shaft 210 within the housing 194 is fixedly mounted an idler sprocket 224. A driven sprocket 226 is fixedly mounted on each opposite end of the rearward end shaft 212 within the housing 194. Upper and lower idler sprockets 228, 230 are rotatably mounted respectively at each opposite ends of shafts 220, 222 within the housing 194.

An endless link chain 232 extends between and over the pair of forward idler and rearward driven sprockets 224, 226 along each of the sidewalls 196, 198 within the housing 194. Each chain 232 further extends over the pair of upper and lower idler sprockets 228, 230 along each of the sidewalls 196, 198 within the housing 194 and is supported and guided along each of the sidewalls 196, 198 by horizontal upper and lower ledges 234, 236 formed thereon and projecting inwardly toward the longitudinal centerline of the housing 194. An endless series of time bars 238 extend transversely between, and are suitably connected at their opposite ends of the chains 232 at regularly spaced intervals and each have a row of spaced apart outwardly projecting tines 240 mounted thereon. The tips of the tines 240 traverse path 242, as shown in FIG. 1, with the tines 240 moving rearwardly from the forward end 214 to the rearward end 216 of the conveyor 54 on a lower course 224 of the path 242 and forwardly from the rearward end 216 to the forward end 214 of the conveyor 54 on an upper course 246 of the path 240.

It is noted that at the forward end 214 of the conveyor 54 the path 242 of the conveyor tines 240 intersects and overlaps the path 154 of the elevator tines 152 and that both courses 244, 246 of the path 242 dip downwardly approximately 45 degrees in view of the lower mounting arrangement of forward end shaft 210 than rearward end shaft 212. The overlapping relationship between the paths 154, 242 and downward dipping arrangement of path 242 at the area of overlap (such not being shown for purposes of clarity in FIG. 4) promotes efficient sweeping of crop material by the conveyor tines 240 from the elevator tines 152 onto the bottom wall 219 at the forward end 214 of the conveyor 54, and thus gentle movement of crop material out of the upward, rear course 158 of path 154 and into the lower, rearward course 244 of path 242, regardless of particular height the conveyor 54 may be at relative to the elevator 46. Thus, it is readily apparent that crop material may be simply and easily transferred through another 90° bend from the elevator 46 to the conveyor 54 as the conveyor 54, along with the enclosure 72, is being vertically moved upwardly from the platform 70.

Interconnecting means, such as a flexible belt 248, is attached to the bottom wall 219 of downwardly projecting portions 218 of the sidewalls 196, 198 and to one of the telescoping doors 190. As the conveyor 54 is moved upwardly along the elevator 46 and relative to the platform 70, the one door 190 slides upwardly within the channels 192. As the lower edge of the upwardly advancing one door 190 nears the upper edge of the next adjacent, stationarily positioned door 190, suitable complementary interengaging means (not shown) on the respective edges become automatically interfitted such that the one upwardly advancing door 190 pulls the next adjacent door 190 with it. The same interfitting occurs between the remaining adjacently positioned doors 190 as the conveyor 54 continues its vertical ascendence relative to the platform 70. When the operation is reversed, that is, when the conveyor 54 is lowered down to its original position after a stack has been formed and discharged from the platform 70, the telescoping doors 190, one by one, return under the influence of gravity to their original, telescoped positions, as shown in FIGS. 1 and 4.

DISCHARGING MECHANISM

Mounted below the bottom wall 219 of the downwardly projecting portion 218 of the conveyor sidewalls 196, 198 and between the elevator 46 and the forward end 56 of the chamber 42 is discharging means 60 comprising a flexible floor 250 being formed of a series of interconnected slats 251 and having one end secured to a cylinder 252 rotatably mounted on a U-shaped support frame 254 and on opposite terminal end 256 secured to a moveable carriage, generally designated 258, of the packing means 66 which will be described hereinafter in greater detail. The U-shaped support frame 254 is mounted between forward ends 260 of a pair of oppositely facing guide rails 262 formed along opposing sidewalls 264, 266 of the enclosure 72 (FIG. 5) which rails 262 will be described in greater detail in connection with the description of the packing means 66 hereinafter.

The floor 250 extends from the cylinder 252 along and between a pair of oppositely facing channel-like guides 268 fixed respectively along the lower edges of the conveyor sidewalls 196, 198. The cylinder 252 is rotatably mounted about a shaft 270 extending between, and fixed at its opposite ends to, opposing upright end sections 272 of the U-shaped frame 254. Biasing means, such as a torsional spring 274, interconnecting the cylinder 252 and the shaft 270 in any suitable manner, tends to rotate the cylinder 252 in a counterclockwise direction, as seen in FIG. 7, and, thus, bias the floor 250 toward a wound, retracted condition about the cylinder 252, as illustrated in FIG. 1. However, in view of the attachment of the terminal end 256 of the floor 250 to the carriage 258, as the carriage 258 is moved back and forth between the first and second ends 56, 58 of the chamber 42 along the guide rails 262 of the enclosure 72, the floor 250 is correspondingly drawn out or extended to adjacent the second end 58 and then, because of the biasing spring 274, retracted to adjacent the first end 56 of the chamber 42.

As stated hereinbefore, during operation of the machine 10, crop material is continuously being picked up, elevated vertically and conveyed rearwardly across forward bottom wall 219 respectively by the pickup 52, the upright elevator 46, and the horizontal conveyor 54 of the system 44. Since it is readily apparent that the floor 250 provides the surface upon which the crop material is conveyed toward the second end 58 of the chamber 42 by the conveyor 54, the distance between the location of the terminal end 256 of the floor 250 and the forward bottom wall 219 of the conveyor 54, at any particular instance during the operation of the machine 10, determines the effective conveying length of the conveyor 54 toward the opposite second end 58 of the chamber 42. Preferably, the carriage 258 moves at approximately the same speed as, or a slightly greater linear speed than, that of the conveyor 54. Therefore, during extension of the floor 250 along the bottom end of the conveyor 54 toward the second end 58 of the chamber 42 (see FIG. 10), the crop material being continuously conveyed onto the floor 250 adjacent the first end 56 of the chamber 42 will remain between the conveyor 54 and the floor 250 and move rearwardly with the floor 250 and conveyor 54, until the terminal end 256 of the floor 250 reaches the second end 58 (see FIG. 11) and begins to retract back towards the first end 56 of the chamber 42. Then, the portions of the crop material nearest the second end 58 of the chamber 42 begin to discharge from the terminal end 256 of the floor 250 as the floor 250 now retractably moves in an opposite direction relative to the direction of movement of the tines 240 of the conveyor 54 along the lower rearward course 242 of the path 242 being traversed by the tines 240 (see FIG. 12). Consequently, crop material, even though being continuously conveyed from the first end 56 toward the second end 58 of the chamber 42, is only capable of being moved by the conveyor tines 240 rearwardly as far as the ever-changing location of the forwardly advancing terminal end 256 of the floor 250 where it then discharges in a progressive manner into the chamber 42 as the floor 250 of the discharging means 60 progressively retracts from the second end 58.

PACKING MEANS ANAD MOVING MEANS THEREFOR

As a stack of crop material being formed in chamber 42 and supported on the platform 70 of the chamber 42 progressively grows in height as a result of the delivery of additional crop material to the top of the stack by discharge means 60, packing means 66 connected with, and positioned beneath, the terminal end 256 of the floor 250 of the discharge means 60 and extending transversely across the chamber 42 between left and right sides 62, 64 therof, is continuously moved by moving means 68 between the first and second chamber ends 56, 58 and progresively compacts the additional discharged crop material against the top of the stack.

The packing means 66 is comprised by a packing drum or roll 276 preferably having a cylindrical shape, and the aforementioned carriage 258 which rotatably mounts the packing roll 276 by rotatably mounting shafts 278 fixed to and extend outwardly from opposing ends of the roll 276.

Figure 8:
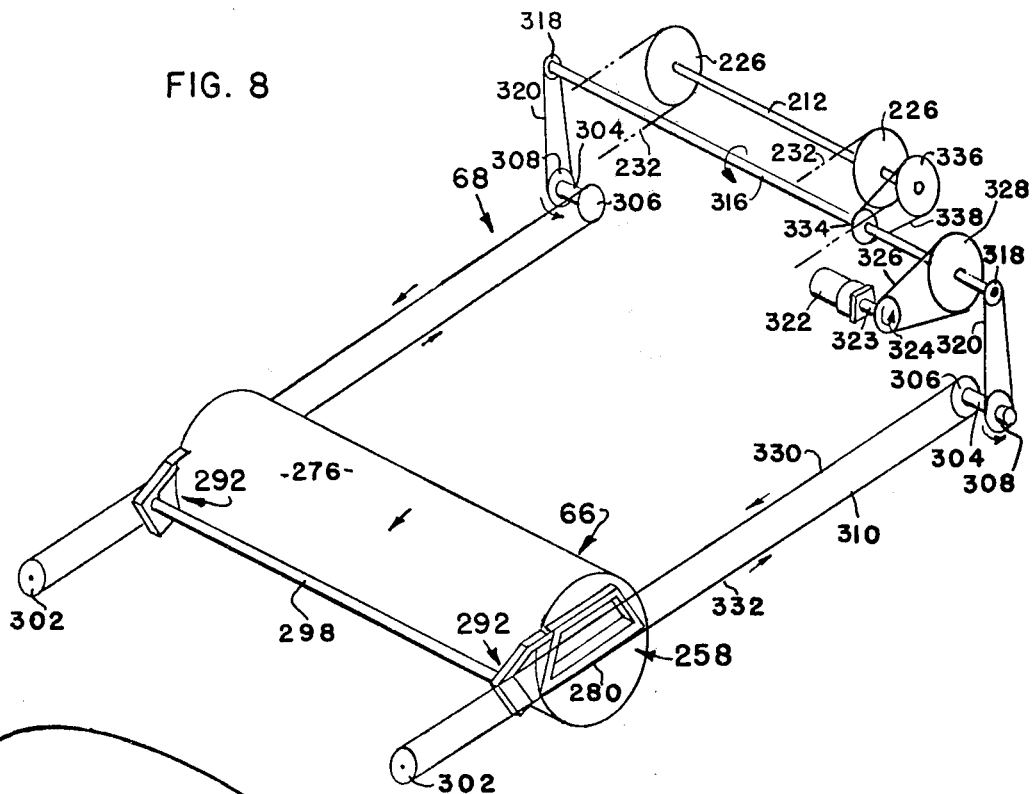
FIG. 8 is a schematic representation of the means for moving the packing roll between the ends of the enclosure.
Figure 9:
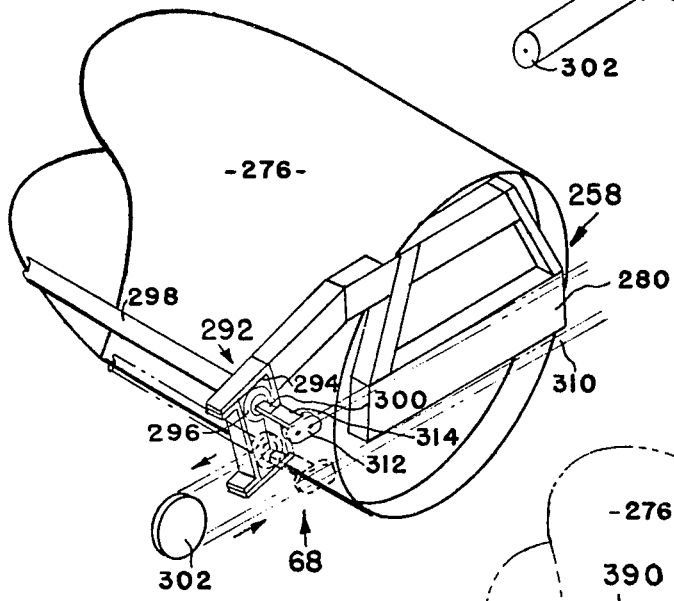
FIG. 9 is an enlarged fragmentary view of an end of the packing roll and moving means of FIG. 8.

The carriage 258, as more partiicularly shown in FIG. 7 and partially shown in FIGS. 8 and 9, is comprised by a pair of trapezoidally-shaped frame structures 280 interconnected by a U-shaped support member 282 which at its opposite ends extends upwardly from the structures 280 and then along the top of the roll 276 parallel to the longitudinal rotational axis of the roll 276. Each of the frame structures 280 are formed by a pair of parallel lower and upper frame members 284, 286 with the lower member 284 being longer than the upper member 286, and a pair of side frame members 288 interconnecting the corresponding ends of members 284, 286. The shafts 278 of the roll 276 are respectively rotatably journalled to the lower frame members 284 at approximately the centers thereof. A roller 290 is rotatably fixed to the outer side of each of the lower frame members 284 on both sides of, and spaced from, the centers of the members 284. The rollers 290 fit within and run along the pair of oppositely facing guide rails 262 formed along opposing sidewalls 264, 266 of the enclosure 72 to thereby mountably couple the packing roll 276 across the enclosure 72 for movement by the moving means 68 between the ends 56, 58 of the enclosure 72.

A yoke 292 is fixed to, and extends from, the forward side of each of the frame structures 280 of the carriage 258 along the general horizontal plane of movement of the packing roll 276. A generally vertically directed slot 294 is defined in each of the yokes 292 for confining and accommodating a roller 296 being rotatably mounted on each of the opposite ends of a tie shaft 298 which extends along the forward side of the roll 276 parallel to the longitudinal rotational axis of the roll 276. Further, a linking element 300 is fixed to, and extends axially from, each of the opposite ends of the tie shaft 298.

The moving means 68 for the packing means 66 is comprised by a forward idler sprocket 302 rotatably mounted in any suitably manner above each of the forward ends 260 of the guide rails 262 in sidewalls 264, 266 of the enclosure 72, as shown in FIG. 1. Further, the moving means 68 includes a shaft 304 rotatably mounted in any suitable manner above each of the guide rails 262 at a location adjacent to, but forwardly of the second end 58 of the enclosure 72, as also seen in FIG. 1. As more clearly seen in FIG. 8, each of the shafts 304 have fixed thereto at its inner end an inner driven sprocket 306 and at its outer end an outer driven sprocket 308. An endless drive chain 310 extends between and over the pair of idler and inner driven sprockets 302, 306 along and above each of the enclosure rails 262. Referring to FIG. 9, it is seen that a corresponding one of the links 312 of each of the endless chains 310 (only the left chain being shown) has an inwardly projecting link element 314 fixed thereto at the inner side of the link 312. The link element 314 of each of the drive chains 310 is fixed at its outer end portion to the outer end portion of the corresponding linking element 300 of each end of the tie shaft 298.

Still further, the moving means 68 includes a drive shaft 316 rotatably mounted in, and extending between and outwardly, from the right and left sidewalls 196, 198 of the horizontal conveyor housing 194 and located adjacent the rearward end 216 of the horizontal conveyor 54 but forward of the shaft 212 of the horizontal conveyor 54. Mounted at each of the opposite ends of drive shaft 316 is a driving sprocket 318 located generally directly above a corresponding one of the outer driven sprockets 308 of shafts 304. An endless driving chain 320 extends vertically between and over the pair of outer driven and driving sprockets 308, 318 adjacent to each of the opposite sides of the rearward end 216 of the horizontal conveyor 54 and the second end 58 of the enclosure 72. A hydraulic motor 322 supplied from a suitable power source (not shown) is mounted to the outer surface of the left sidewall 196 of the horizontal conveyor housing 194 forwardly of the drive shaft 316 and has a rotatably output shaft 323 with a drive pulley 324 mounted on its outer end. An endless drive belt 326 extends between and over the drive pulley 324 and a driven pulley 328 fixed to the drive shaft 316.

As viewed in FIG. 8, the counterclockwise rotary motion of the hydraulic motor 322 is transferred to the drive shaft 316 by the endless drive chain 326 and then transferred to the lower intermediate drive shafts 304 from opposing ends of the drive shaft 316 by the endless driving chains 320. Counterclockwise rotary motion of drive shafts 304 cause an upper course 330 of each of the endless drive chains 310 to move in a forward direction toward the first end 56 of the enclosure 72 and a lower course 332 of each of the endless drive chains 310 to move in a rearward direction toward the second end 58 of the enclosure 72 (see FIG. 10).

Since the packing means 66 is shown in FIG. 8 moving from the second or rearward end of the enclosure (not shown) toward its first or forward end, the link 312 of each drive chain 310, which is interconnected to the corresponding opposite end of the tie shaft 298 of the packing roll carriage 258, must be travelling along the corresponding one of the upper courses 330, which is shown more clearly in FIG. 9. Since the respective yokes 292 are maintained in a predetermined fixed positional relationship to the upper and lower courses 330, 332 of the drive chains 310 in view of the mounting relationship of the opposite pairs of spaced apart carriage rollers 290 within the opposing guide rails 262 of the enclosure 72 wherein only horizontal movement of the carriage 258 relative to the enclosure 72 is allowed, the rollers 296 on the ends of the tie shaft 298 will be positioned within the respective upper ends of yoke slots 294 (see FIGS. 9 and 12) when links 312 are travelling along upper courses 330 of drive chains 310 and will be positioned within the respective lower ends of yoke slots 294 (see FIG. 10) when links 312 are travelling along lower courses 332 of drive chains 310.

In FIG. 9, the packing means 66 is shown about to reach its extreme forward position at the first end 56 of the enclosure 72. As the packing means 66 moves forward and approaches the forward idler sprockets 302 (the left one being shown), the rollers 296 (the left one being shown) are positioned at the upper ends of the yoke slots 294. As the packing means 66 reaches its extreme forward position, the rollers 296 and tie shaft move forwardly and downwardly toward the opposite lower ends of the yoke slots 294 in a path following the contour of the idler sprockets 302. This gradual change in the direction of movement of the tie shaft 298, from strictly forward movement, decelerates the forward movement of the packing means 66. After the tie shaft rollers 296 have reached the horizontal level of the axis of the sprockets 302 (at which position the speed of the packing means 66 would be momentarily at zero), the motion of the tie shaft 298 changes to downward and rearward movement and thus, until the motion becomes solely rearward, accelerates the rearward motion of the packing means 66 toward the second end 58 of the enclosure 72. Then, as the packing means 66 moves solely rearwardly, now at a constant velocity, after the tie shaft rollers 296 have left the path which follows the contour of the idler sprockets 302, the tie shaft rollers 296 are positioned at the lower ends of the yoke slots 294 (see FIG. 10). As the packing means 66 reaches its extreme rearward position at the second end 58 of the enclosure 72 (shown approaching it in FIG. 11), the tie shaft rollers 296 first move rearwardly and upwardly and then forwardly and upwardly toward the opposite upper ends of the yoke slots 294 in a path following the contour of inner driven sprockets 306. This gradual change in the direction of movement of the tie shaft 298 at the rearward end 58 likewise decelerates, momentarily stops, and then accelerates, after the rollers 296 past the horizontal center line of the inner driven sprockets 306, the motion of the packing means 66 until it becomes solely forwardly toward the first end 56 of the enclosure 72. Then, during forward movement of the packing means 66, the tie shaft rollers 296 are again positioned at the upper ends of the yoke slots 294 (see FIG. 12).

The above-described coupling arrangement between the drive chain 310 and the tie shaft 298 advantageously provides for a very smooth change in the direction of movement of the packing means 66 as the packing means 66 continuously travels back and forth between the ends 56, 58 of the enclosure 72, and, at the same time, advantageously allows the use of a constantly rotating means as the source of power for the moving means 68 and, thus, the packing means 66. The above-described arrangement and operative coupling of the opposite ends of the drive shaft 316 with the pair of drive chains 320 has the effect of tying the two drive chains 310 together and keeping them in timed operation as well as providing uniform rotary power to both sides of the enclosure 72.

Figure 10:
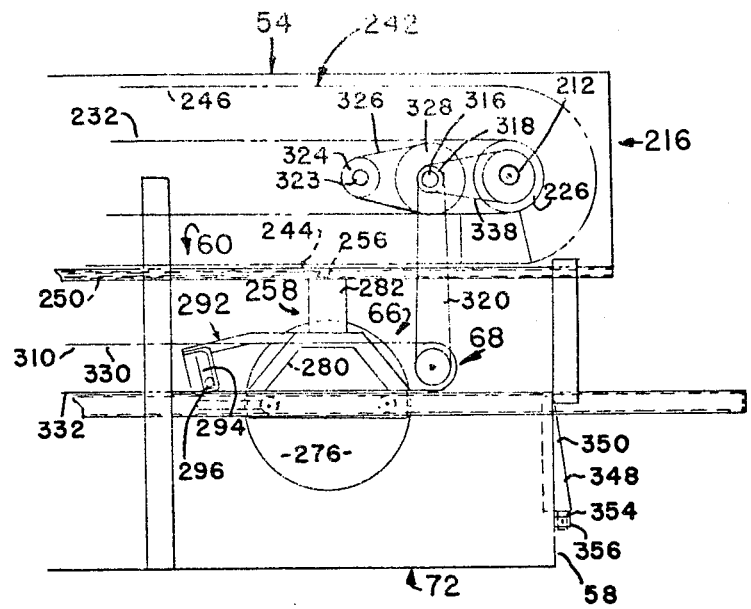
FIG. 10 through 12 are enlarged fragmentary side elevational views of the opposite second end of the second form of the enclosure of the stack forming chamber along the packing roll and the floor moving toward the second end in FIG. 10, the packing roll and the floor reaching the second end with the packing roll engaging and pivoting the end gate of the enclosure of the second end in FIG. 11, and the packing roll and the floor moving away from the second end in FIG. 12 whereby crop material begins to discharge into the enclosure of the stack forming chamber.
Figure 11:
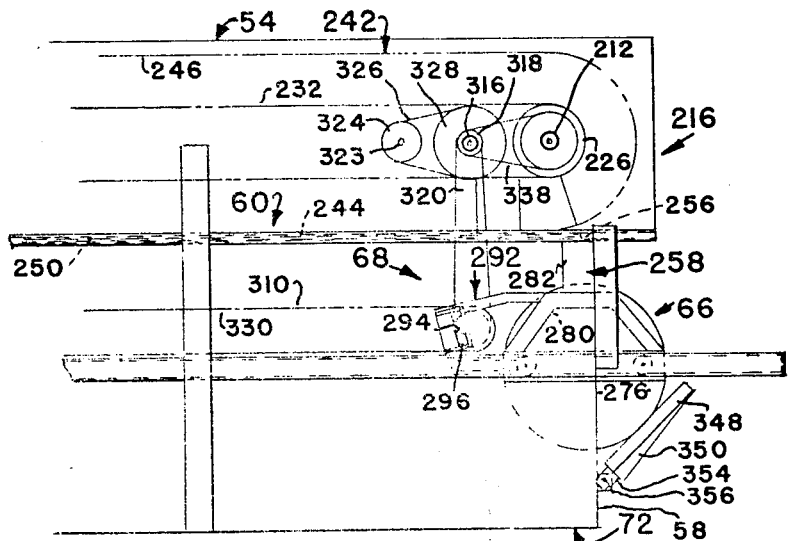
Figure 12:
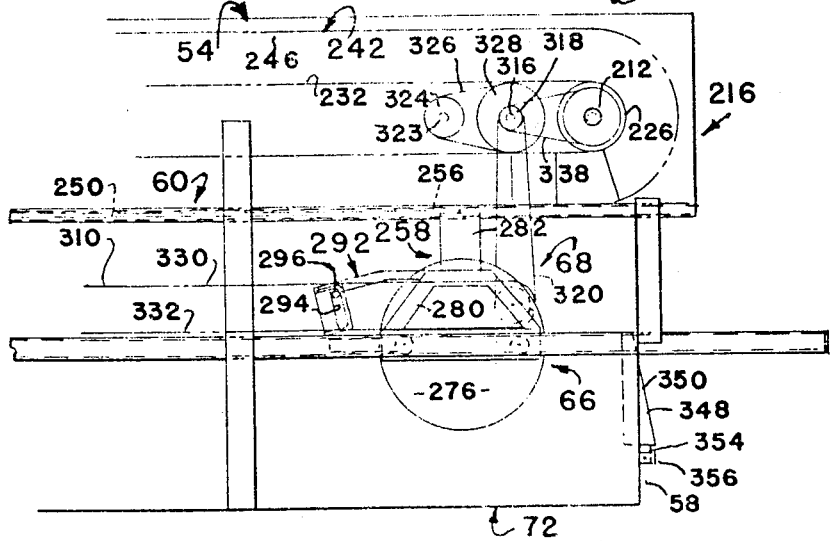

Further, the location of the drive shaft 316 near the rearward end 216 of the horizontal conveyor 54 allows the drive shaft 212 of the conveyor 54 to be coupled with, and driven by, the drive shaft 316. This is achieved, as illustrated in FIGS. 10 through 12, and more clearly in FIG. 8, by providing an intermediate drive sprocket 334 fixed on drive shaft 316 and an outer drive sprocket 336 fixed on the left end of the shaft 212 outside of the conveyor housing 194 and operatively interconnecting them by extending an endless coupling drive chain 338 between and over the sprockets 334, 336.

Finally, the diameters of the various aforementioned sprockets may be selected so as to achieve the desired velocity relationship between the horizontal conveyor 54 and the packing means 66. For example, the driving sprockets 318, and the intermediate drive sprocket 334 could have the same diameter and the diameter of the outer driven sprockets 308 could be slightly smaller than the diameter of the outer drive sprocket 336, whereby the packing means 66 and thus the flexible floor 250 will move at a slightly higher velocity than the horizontal conveyor chains 242. This relationship would cause the terminal end 256 of the floor 250 to somewhat lead the crop material being carried thereon as the floor 250 approaches the second end 58 of the enclosure 72 and reverses its direction at the second end 58 as the packing means 66 gradually changes its direction of movement as hereinbefore described, whereby any possibility of crop material being discharged beyond the second or rearward end 58 of the enclosure 72 is avoided.

END GATES FOR THE ENCLOSURE

It should be noted that in the general construction of the enclosure 72 of the packing chamber 42, as clearly shown in FIG. 5, left and right sidewalls 264, 266 have a substantially greater height than front and rear endwalls 340, 342. In fact, the top longitudinal edges 344, 346 of endwalls 340, 342 are preferably below the horizontal plane of the bottom of the cylindrical packing roll 276. In other words, for a predetermined distance below the bottom of the packing roll 276, such as approximately 1 foot, the enclosure 72 is in the form of a four-sided closed structure. However, from the bottom of the packing roll 276 upwardly to approximately a horizontal plane through the center of the packing roll 276, the enclosure 72 is closed at its sides and open at its ends. Thus, as the packing means 66 is moved along guide rails 262 between the first and second ends 56, 58 of the enclosure 72, at its extreme forward and rearward positions the packing roll 276 is desirably located correspondingly between the forward ends 260 and rearward ends 347 of the rails 262 and partially beyond the ends 56, 58 of the enclosure 72, with its bottom generally overlying the top longitudinal edges 344, 346 of the endwalls 340, 342, in order that the crop material discharged onto the top of the stack being formed and being contained within the confines of the enclosure 72 may be compacted by the packing roll 276 right up to the forward and rear upper edges of the stack adjacent to the endwalls 340, 342 of the enclosure 72.

However, it is readily apparent that during movement of the packing roll 276 to its extreme forward and rearward positions (the forward position being illustrated in FIG. 5) there is a tendency for some of the discharged crop material to be pushed or extruded ahead by the roll 276 and thus over the edges 344, 346 of the endwalls 340, 342 of the enclosure 72 and lost. Of course, the extent to which this tendency actually results in crop material loss may also depend on other factors such as the coarseness or fineness of the crop material being compacted, its moisture content, etc.

The tendency for crop material loss over the endwalls 340, 342 of the enclosure 72 is eliminated by the provision of an end gate 348 at each of the first and second ends 56, 58 of the enclosure 72, as shown in FIG. 1. Each of the end gates 348 are pivotally mounted to a respective one of the enclosure endwalls 340, 342 so as to pivot between a first vertical position closing the corresponding enclosure end (as seen in FIG. 3) and a second horizontal position opening the corresponding enclosure end (as shown in FIG. 1), and about a horizontal axis extending generally along, or near to, each of the top longitudinal edges 344, 346 of the enclosure endwalls 340, 342 and below the bottom of the packing roll 276 when the roll 276 is located at either of its extreme forward and rearward positions.

For pivotally mounting the end gates 348, each of a series of vertically-extending, spaced apart support brackets 350 are fixed to the outer surface 352 of each of the end gates 348 and have a lower connecting tab 354 projecting downwardly below the gate outer surface 352 which tab 354 is interfitted between, and pivotally coupled with, a pair of outwardly protruding, spaced apart tabs 356 of a series of tab pairs 356 being fixed to the outer surface 358 of each of the enclosure endwalls 340, 342 and spaced apart to correspond with the series of brackets 350.

Further, means are associated with each of the end gates 348 for positioning each one of the end gates 348 in its first position, at which it closes the corresponding end of the enclosure 72, prior to each engagement by packing roll 276 with the one gate 348 to pivotally move the one gate 348 to its second position, at which it opens the corresponding end of the enclosure 72. The gate positioning means may take either of two forms.

The first form is an interconnecting means, such as flexible cables 360 shown in FIG. 6, which are attached at their opposite ends to corresponding opposite sides of the end gates 348 and run along the inside of opposing enclosure sidewalls 264, 266 within respective tracks 362 formed within the sidewalls 264, 266 parallel to, and below, guide rails 262 (not shown in FIG. 6). The flexible cables 360 have a predetermined length such that when one of the end gates, such as the rearward end gate 348 as shown in solid line in FIG. 6, has been engaged by the packing roll 276, such as when the roll reaches its extreme rearward position as also shown in solid line in FIG. 6, and pivoted outwardly and downwardly to its second position to open the upper area of the corresponding second end 58 of the enclosure 72 to allow for passage of the packing roll 276 partially therethrough, the other of the end gates, such as the forward end gate 348 as shown in solid line in FIG. 6, has been pivoted upwardly and inwardly from its second position to its first position located adjacent to, and substantially closing, the upper area of the corresponding first end 56 of the enclosure 72. When the packing roll 276 reaches its extreme forward position, as shown in broken line in FIG. 6, the respective other end gate 348 at the first end 56 of the enclosure 72 is pivoted accordingly to its second, open position through engagement by the packing roll 276 and the one end gate 348 at the second end 58 of the enclosure 72 is pivoted accordingly to its first, closed position.

The second form of the gate positioning means is less complicated than the first and comprises biasing means, such as springs 364, suitably associated with the respective pivotal connections between the connecting tabs 354 of the brackets 350 on end gates 348 and the pairs of tabs 356 on the enclosure endwalls 340, 342. Each of the springs 364, as shown schematically in FIG. 3 (only being shown on rear endwall 342), may be fixed at its opposite ends respectively to one of the tabs of each pair of tabs 356 and/or the outer wall 358 of each of the enclosure endwalls 340, 342 and then connected in its middle section to the corresponding one of the connecting tabs 354 at a location spaced above the pivotal axis between the tabs 354, 356. The springs 364 preferably are biased to normally urge the end gates 348 into their first positions. However, each of the springs 364 are yieldable to allow pivotal movement of each end gate 348 from its first position to its second position upon engagement by the packing roll 276.

Regardless of which one of the two above-described forms of gate positioning means is utilized, crop material which tends to extrude out ahead of the packing roll 276, as the roll 276 reaches either of its extreme forward and rearward positions, will be retained on the outwardly and downwardly pivoted end gate 348 and thus be prevented from being pushed and lost over the enclosure endwalls 340, 342. When the end gate 348 is returned to its first vertical position by either of the aforementioned forms of positioning means, the crop material thereon will be deposited back inside the enclosure 72 and on top of the respective adjacent upper edge of the stack to be compacted by the packing roll 276 on its next pass.

SPREADING MEANS

Referring to FIGS. 3 and 4, it is apparent that, in the preferred embodiment of the machine 10, the width of the pickup 52, the elevator 46, the horizontal conveyor 54 and the discharging flexible floor 250 is considerably narrower than the width of the platform 70 and enclosure 72 of the stack forming chamber 42 and the width of the cylindrical packing roll 276 of the packing means 66. Therefore, crop material discharging into the chamber 42, in the absence of some provision for causing lateral distribution thereof, would tend to concentrate or accumulate along the longitudinal central portion of the platform 70 and thereby impede the formation of a compact stack having the desired uniform density and stability characteristics. However, there are several ways to obviate this impediment.

One way to achieve even lateral distribution of crop material upon the platform 70 is to modify the crop windrow, the pickup 52, the elevator 46, the horizontal conveyor 54 and the flexible floor 250 by increasing their widths so that they transversely extend the full width of the platform 70.

Another, and more preferred, way to achieve even lateral distribution of crop material is to provide spreading means, generally indicated by numeral 366 in FIGS. 3 and 13 through 15, associated with the terminal end 256 of the extensible and retractable flexible floor 250 such that spreading or lateral distribution of the crop material is performed upon its discharge past the terminal end 256 and the rearward side of the packing roll 276 and into the chamber 42.

The spreading means 366 includes a series of tines 368, each tine 368 being mounted on a base member 370 fixed to the top surface of the U-shaped support member of the packing roll carriage 258 for swinging or pivotal movement about a pivot 372. Each of the tines 368 at a short forwardly-extending end portion 373 thereof are pivotally mounted to a laterally moveably common arm 374 about a pivot 376. The common arm 374 is pivotally interconnected to the opposite ends of the fixed base member 370 by link members 378 for movement in either left or right lateral directions relative to the direction of travel of the machine 10. In such manner, the longer rearwardly-extending end portions 379 of the tines 368 swing or oscillate laterally along an arcuate path upon movement of the common arm 374.

A generally planar ledge 380 extends outwardly from the lower longitudinal edge of the left sidewall 196 of the horizontal conveyor housing 194 and has a sinusoidal curved cam track 382 extending downwardly therefrom and running from near the forward end 214 to near the rearward end 216 of the horizontal conveyor 54. The outer end of the common arm 374 mounts a pair of cam follower rollers 384 which are confined by, and run on, the cam track 382 as the packing means 66 travels between the ends 56, 58 of the chamber 42. As the rollers 384 run along the track 382 during movement of the packing means 66 from the second end 58 toward the first end 56 of the chamber 42 and progressive discharging of crop material from the terminal end 256 of the floor 250, the common arm 374 laterally moves alternately toward and away from the right side 64 of the chamber 42 and pivots the rearwardly-extending end portions 379 about their respective pivots 372 and along their aforementioned arcuate path. As crop material drops on the swinging tine end portions 379, it is spread, scattered or distributed substantially evenly between the left and right sides 62, 64 of the chamber 42. It should be noted that the lengths of the tine end portions 379 vary with the outer tines being the longest and the ones therebetween being shorter, the middle tine being the shortest. This rearward end profile on the series of tines 368 causes the crop material to be spread in a straight line, rather than an arc, across the chamber 42.

When the compact stack has been substantially formed to a desired predetermined height, it is usually desirable to top off or crown the stack by allowing the final quantities of crop material to accumulate along the central longitudinal portion of the stack. This gives the completed stack a rounded off, instead of a flat, top which gives the stack a better moisture-shedding and weathering characteristic. Therefore, an automatic disengaging mechanism is provided at the rearward end of the cam track 382 and comprises a biased bracket 386 which may be unlatched and pivoted away from the end 388 of the cam track 382 in any suitable manner to allow the rollers 384 to run off and become disengaged from the track 382 whereby the spreading means 366 will be rendered inoperative until the rollers 384 are manually replaced on the track 382 and the bracket 386 is latched into engagement with the track end 388.

The spreading means 366, as above-described, is a simple and relatively uncomplicated and inexpensive way to laterally distribute the crop material. A further significant advantage of the spreading means 366 is that it gently and efficiently spreads the crop material without chopping it or mutilating any leave portions of the material.

DENSITY CONTROL MEANS

The packing means 66 moves forwardly and rearward between the ends 56, 58 of the stack forming chamber 42 at a predetermined height or elevation above the platform 70 of the chamber 42 (initially as schematically shown in FIGS. 17 to 20) until the cylindrical packing roll 276 of the packing means 66 has compacted the crop material to a desired level of density. Once the desired level of density is reached and concurrently with the continuing stack forming operations, the hydraulic cylinders 116 are simultaneously actuated through suitable hydraulic controls (not shown) to cause pivotal scissoring movement of the lift legs 76, 78 from their folded position of FIG. 1 through a short distance toward their unfold position of FIG. 2 Such unfolding, pivotal scissoring movement of the lift legs 76, 78 elevates the enclosure 72, with the packing means 66 being carried thereacross, and the horizontal conveyor 54 through a correspondingly short distance or displacement vertically upwardly above the platform 70. Eventually, through the continuous forward and rearward movement of the packing means 66, the desired level of density is again reached and actuation of the hydraulic cylinders 116 and unfolding of lift legs 76, 78 is again effected through a short distance.

Consequently, it is readily apparent that some means or measure must be employed to determined when the desired level of density of the compacted crop material has been reached.

For the experienced operator, the measure applied may need only be his intuitive feel which he may derive from his intimate knowledge of several important factors, such as the moisture content and the density of the windrowed crop lying on the field. He may be able to readily translate this information into the requisite number of passes he will be able to make across the field with the machine 10 before the desired level of density will be reached and actuation of the hydraulic cylinders 116 will be necessary.

However, it is readily understandable that a more dependable and automatic means of determining when the desired level of density of the compacted crop material has been reached is more desirable than relying on the intuition of the operator.

Figure 16:
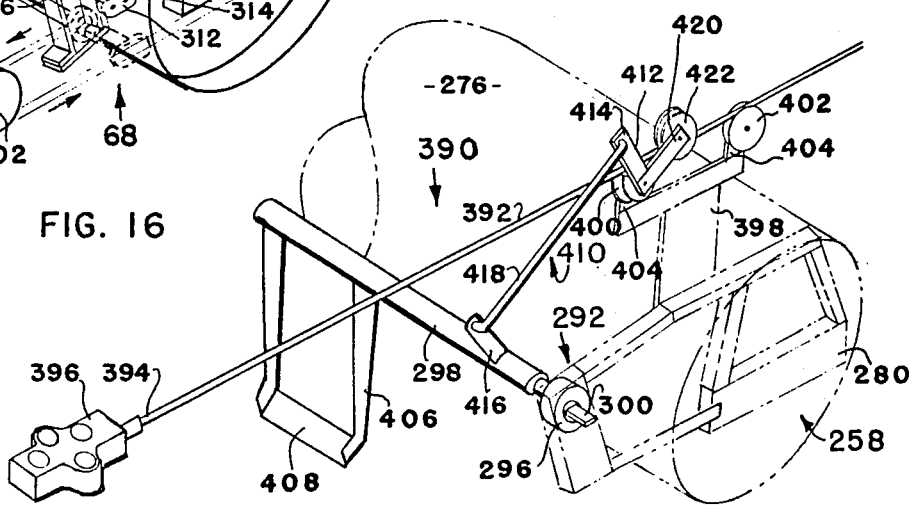
FIG. 16 is a schematic representation of a stack density sensor and control device which may be used to sense a preselected desired density level of the stack and actuate the means for mounting the enclosure, the floor and horizontal conveying portion of the machine to cause the mounting means to vertically displace the enclosure with the packing means being coupled therewith, the floor and the horizontal conveying portion with respect to the crop material receiving platform through a predetermined distance as the compact stack grows in height on the platform.

For this purpose, the machine 10 may incorporate as an optional feature a density control means, being indicated generally as numeral 390 in FIG. 16, which automatically senses the density or amount of compaction that the packing roll 276 has applied to the crop material. The density control means 390 includes a cable 392 being attached at one end to a suitable bracket (not shown) fixed to, and inwardly extending from, the vertical rear post 112 at the left side 62 of the chamber 42, relatively tautly drawn longitudinally along the left chamber side 62 generally above the left guide rail 262, and attached at its other opposite end 394 to a hydraulic valve 396 being mounted to another bracket (not shown) fixed to, and inwardly extending from, the forwardly slanting post 86 also at the left side 62 of the chamber 42. The hydraulic valve 396 is suitably incorporated into the hydraulic controls (not shown) which actuate the hydraulic cylinders 116. In other words activation of the hydraulic valve 396 will automatically allow the pressurized flow of oil into the hydraulic cylinders 116 and cause extension of their piston rods 120 until the flow of oil is terminated.

The density control means 390 further includes a T-shaped support 398 fixed to, and extending upright from the left yoke 292 of the packing means 66. A pair of spaced apart lower pulleys 400, 402 are suitably rotatably mounted to support tabs 404 which are fixed to, and extend upwardly from, opposite outer ends of the T-shaped support 398. The lower pulleys 400, 402 are aligned with the cable 392 such that the lower side of the cable 392 is supported by, and runs within, the respective peripheral grooves of the pulleys 400, 402.

Still further, the density control means 390 includes a sensor paddle 406 fixed to the lower side of the tie shaft 298 which has a lower forwardly inclined heel portion 408 for engaging the top of the crop material stack within the chamber 42. When the paddle heel portion 408 is not engaged with the stack, the paddle 406 will normally hang downwardly from the tie shaft 298 in a generally vertical plane.

In view of the fact that the tie shaft 298 is positioned somewhat higher relative to the stack when the elevation of the tie shaft 298 is generally equivalent to that of the upper end of the yoke slots 294 during movement of the packing means 66 from the second chamber end 58 toward the first chamber end 56 than when its elevation is generally equivalent to that of the lower end of the yoke slots 294 during movement of the packing means 66 from the first chamber end 56 toward the second chamber end 58, engagement between the paddle heel portion 408 and the stack is possible only when the tie shaft 298 is at its lower elevation that being when the packing means is moving rearwardly from the first end 56 toward the second end 58 of the chamber 42.

The density control means 390 actually senses the amount of spring back of the crop material after the packing roll 276 has passed over it during the compaction process upon its rearward pass. As the compacted crop material builds in height in the chamber 42, the spring back of the material, after the roll 276 has passed over it, will increase and, upon each rearward pass of the roll 276, cause an increasing amount of clockwise rotation of the paddle 406, as viewed from the left side 62 of the chamber 42 as shown in FIG. 16.

The clockwise rotational movement of sensor paddle 406 is transmitted to the cable 392 through linkage 410 and will cause the cable 392 to become shortened in its effective length from end to end. The linkage 410 includes an elbow member 412 mounted to the one support tab 404 which mounts the lower pulley 400 and pivoted about the rotational axis of the pulley 400. A forward segment 414 of the elbow member 412 is interconnected at its outer end to the tie shaft 298 by a bracket 416 fixed to the tie shaft 298 and a connecting rod 418 being pivotally journalled at its opposite ends respectively to the outer ends of the bracket 416 and the forward segment 414. A rearward segment 420 of the elbow member 412, being fixed at a generally right angle to the forward segment 414 at the location of pivotal mounting of the elbow member 412, rotatably mounts at its outer end an upper pulley 422.

When the paddle 406 is normally hanging downwardly in a vertical plane below the tie shaft 298 with its heel portion 408 disengaged from the stack, the upper pulley 422 rests upon the upper side of the cable 392 with the cable 392 running within the peripheral groove of the pulley 422. Clockwise rotation of the paddle 406 in turn, through bracket 416 and rod 418, causes clockwise rotation of the elbow member 412 and, thus, causes the upper, center pulley 422 to depress the cable 392 downwardly between the outer, lower pulleys 400, 402 which, in turn, shortens the effective length of the cable 392. When the condition of maximum crop material spring back and, thus, maximum rotation of the sensor paddle 406 has been reached, maximum shortening of the effective length of the cable 392 will result and the hydraulic valve 396, having been preset to become activated by the pull of the cable when it has shortened to such reduced length, will automatically allow the pressurized flow of oil into the hydraulic cylinders 116 which results in further elevated displacement of the enclosure 72 and horizontal conveyor 54 above the platform 72.

As the sensor paddle 406 clears the top of the stack, the hydraulic valve 396 is deactivated and the unfolding movement of lift legs 76, 78 terminates. Then, the simultaneously ongoing stack forming process continues at a new higher level above the compact stack being formed on the platform 70.

COMPACT STACK FORMING OPERATION

FIGS. 17 through 24 schematically illustrate the operations of the machine 10 as it moves across the field in continuously picking up crop material and progressively forming a large, compact stack of the crop material.

FIG. 17 represents the commencement of stack forming operation with the machine 10 being set up as shown in FIG. 1. The windrowed crop material is being continuously lifted from the field by pickup 52 through a 90° turn to the elevator 46 which continues upward movement of the material until the material is swept from the vertically upward path of the elevator 46 through another 90° turn and into a rearwardly-moving horizontal path of the horizontal conveyor 54. As the material enters the horizontal conveyor path, it encounters, and is carried rearwardly by, the unwinding flexible floor 250 with the assistance of the rearwardly-moving tines of the conveyor 54. The floor is being unwound by the rearward movement of the packing means 66 to which the floor is coupled at a terminal end 256 thereof.

Figure 18:
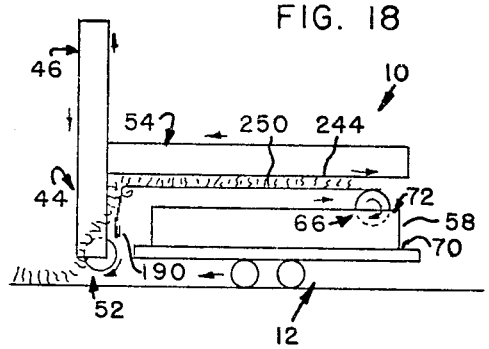

In FIG. 18, the packing means 66, the floor 250 and the initial portions of the crop material have almost reached the second or rearward end 58 of the enclosure 72 and platform 70. Upon reaching the second end 58, the packing means 66 automatically reverses its direction of movement and then moves forwardly toward the first end 56 of the enclosure 72 and platform 70. As soon as the direction of movement of the packing means 66 has so reversed, the floor 250 automatically begins to wind up and return to its initial condition. However, the horizontal conveyor 54 continues to move rearwardly along the lower course 244 of its path 242 and thus prevents forward movement of the crop material which had been previously carried toward the second enclosure end 58 by the floor 250. Instead, the floor 250 in rewinding forwardly moves out from under the material and allows the material to discharge through the open top of the enclosure 72 and onto the platform progressively from the second end 58 to the first end 56 of the enclosure. It will be noticed that the crop material is discharging to the rearward side of the forwardly-moving packing means 66 and thus will not be compacted by the packing means 66 until upon return pass thereof toward the second end 58 of the enclosure 72.

Figure 20:
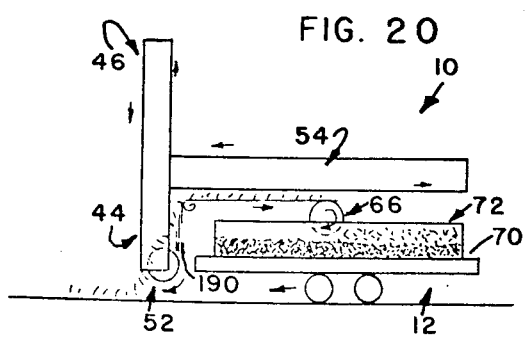

FIG. 20 shows the foundation of a compact stack starting to form on the platform 70 and the packing means 66, after having made several round trips, again moving toward the second end 58 of the enclosure 72 and compacting crop material which had previously been discharged onto the compact stack foundation.

As crop material continues to be discharged and compacted, the density of the compact stack continuously increases. Soon a maximum level of density is reached whereupon the enclosure 72 and conveyor 54 are displaced vertically upwardly with respected to the platform 70. There is no requirement that the pickup and conveying operations of the machine 10 be temporarily halted while the enclosure 72 and horizontal conveyor 54 are being elevated. While elevation thereof is in progress, crop material may be moved upwardly by the elevator 46, only now it will be swept from the elevator 46 by the horizontal conveyor 54 at a greater height.

Figure 21:
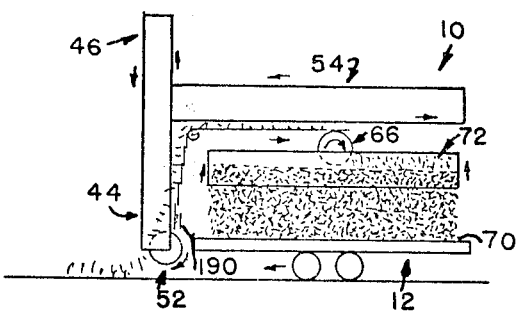
Figure 22:
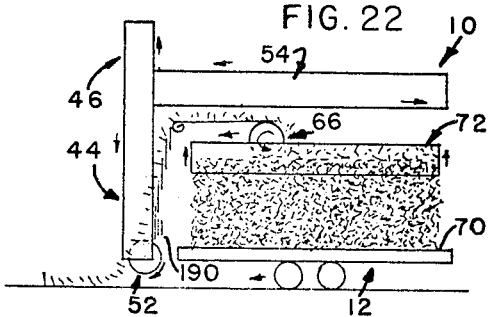
Figure 19:
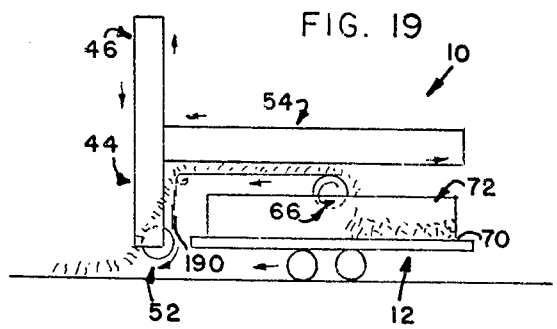
Figure 23:
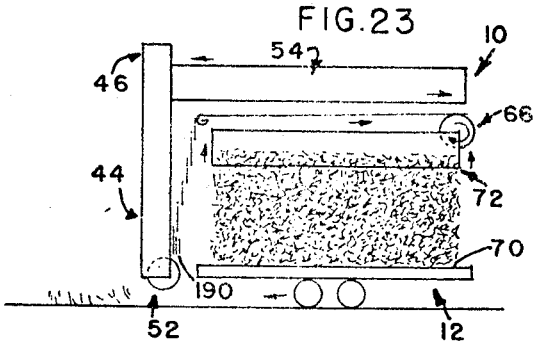

FIGS. 21, 22 and 23 illustrate the relative positions of the enclosure 72, the horizontal conveyor 54 and the telescoping doors 190 during three separate, succeeding stages of stack formation in which the enclosure 72 is clearly depicted as only surrounding and laterally supporting the upper end of the compact stack and the discharged crop material lying on the top of the stack which is being compacted by the packing means 66.

Figure 24:
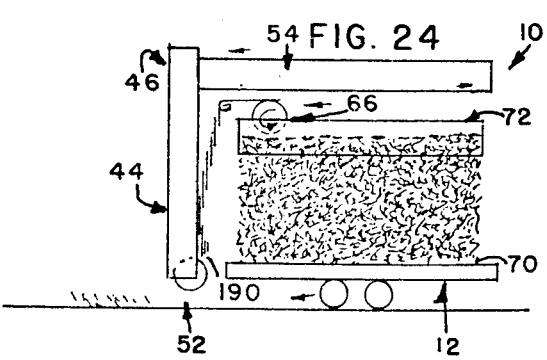

FIG. 24 illustrates the packing means 66 about to reach the first end 56 of the enclosure 72 after making its final pass across the stack. Prior to the packing means 66 making its final two or so round trips, the forward advancement of the machine 10 was halted (or the elevator 46 raised) to allow crop material to clear out of the elevator 46. After the packing means 66 has returned to its extreme forward position, the machine 10 is pulled to a location where the completed stack is intended to be stored.

STACK UNLOADING AND RETRIEVING OPERATIONS

Upon reaching the storage location, actuation of hydraulic cylinders 116 through suitably hydraulic controls (not shown) causes further unfolding of lift legs 76, 78 and thus further vertical displacement of the enclosure 72, the packing means 66 being carried thereacross, the horizontal conveyor 54 and the discharging means 60 with respect to the platform 70 to above the upper portion of the compact stack, as shown in FIG. 2. Now, the stack is free and clear of any lateral obstruction and upon tilting of the main frame 14 relative to the hitch frame 16 may be readily unloaded from the machine 10.

As described hereinbefore, the main frame 14 and hitch frame 16 are pivotally joined together at 34. A jack knife hydraulic cylinder 424 is pivotally journalled at its opposite ends respectively to plate pair 38 mounted on each longitudinal rail 18 of the main frame 14 and to each side members 24 of the hitch frame 16 (only the left hydraulic cylinder 424 being shown in FIGS. 1 and 2). With the machine 10 being suitably secured to the towing tractor (not shown), actuation through suitably hydraulic controls (not shown) of the hydraulic cylinders 424 causes counterclockwise pivoting of the hitch frame 16 and pivotal tilting of the main frame 14 about wheels 22 whereby the chassis 12 is transformed from its operating condition of FIG. 1 to its unloading (or retrieving) position of FIG. 2.

Tilting of the main frame 14 positions a discharge end 426 of the platform 70 adjacent the field. The platform 70 mounts a floor conveyor 428 which comprises a series of endless, spaced apart link chains 430 which respectively extend between and over a series of spaced apart idler sprockets 432 fixed on a shaft 434 rotatably mounted to the platform 70 to extend across and below the top surface 436 of the platform 70 at the second end 58 of the chamber 42 and a corresponding series of spaced apart driven sprockets 438 fixed to a shaft 440 rotatably mounted to the platform 70 to extend across and below the top surface 436 of the platform 70 at the first end 56 of the chamber 42. The shaft 440 may be driven by any suitable source of power (not shown), such as a hydraulic motor or a drive train powered by the pto of the tractor.

As shown in FIG. 3, the endless chains 430 on their upper courses 442 run within longitudinally-extending recesses or channels formed in the platform surface 436 and each have a series of spaced apart lugs 444 fixed thereto and extending outwardly therefrom such that the lugs 444 each project above the platform surface 436 when travelling along the upper courses 446 of the chains 430 and engage the compact stack.

According, through simultaneous forward movement of the machine 10 and operation of the floor conveyor 428 such that the chains 430 move rearwardly along their upper courses 442, the compact stack may be unloaded from the platform 70 onto the ground at the desired storage location. Furthermore, after the stack is deposited on the ground, it may be retrieved by the mere simultaneous movement of the machine 10 rearwardly toward the stack and reverse operation of the floor conveyor 428 such that the chains 430 move forwardly along their upper courses 442.

It is readily apparent in FIG. 2, that the abbreviated nature of the sidewalls and endwalls of the enclosure 72 which allows it to be easily positioned to clear the upper end of the stack greatly enhances the ease with which the compact stack may either be unloaded from, or retrieved by, the machine 10 with no drastic modification to, or removal of parts of the machine 10 being required. Even allowing for a certain amount of lateral settling out of the stack to occur while it is standing in the field before the time retrieving is desired, there is still sufficient clearance between the sides of the settled stack and the lift arms 76, 78 of the machine 10 to allow for unobstructed retrieving of the stack by the machine 10.

It is thought that the invention and many of its attendant advantages will be understood from the foregoing description and it will be apparent that various changes may be made in the form, construction and arrangement of the parts of the machine described without departing from the spirit and scope of the invention or sacrificing all of its material advantages, the form hereinbefore described being merely a preferred or exemplary embodiment thereof.

Having thus described the invention, what is claimed is:

1. In a machine for forming a stack of crop material, such as a compact stack of hay or the like, the combination comprising:
   a mobile chassis adapted to move across a field;
   means mounted upon said chassis for forming crop material into a stack, such as a compact stack of said crop material;
   means mounted upon said chassis adjacent said stack forming means for continuously delivering crop material from the field to above said stack forming means and from adjacent a first end of said stack forming means toward an opposite end thereof;
   means mounted upon said chassis for movement above and between said ends of said stack forming means and having a terminal end, said movably mounted means being positioned adjacent to said delivering means so as to support said crop material being delivered from adjacent said first end toward said opposite second end of said stack forming means by said delivering means and to progressively discharge said crop material past its terminal end from said delivering means to said stack forming means upon movement of said movably mounted means between said ends of said stack forming means; and
   means mounted adjacent said terminal end of said movably mounted means for movement therewith between said ends of said stack forming means and operable for spreading said crop material across said stack forming means upon discharge of said crop material past said terminal end of said movably mounted means.

2. The combination as recited in claim 1, wherein said spreading means comprises:
   a plurality of transversely spaced apart tine members pivotally mounted adjacent said terminal end of said movably mounted means for swinging movement across said stack forming means and extending for a short distance beyond said terminal end and toward said opposite second end of said stack forming means; and
   means mounted upon said chassis and coupled with said tines for causing pivotal swinging movement of said tines as said movably mounted means is moved between said ends of said stack forming means.

3. In a machine for forming a compact stack of crop material such as hay or the like, the combination comprising:
   a mobile chassis adapted to move across a field;
   a stack forming chamber mounted on said chassis;
   means mounted upon said chassis adjacent said chamber for continuously delivering crop material from the field to above said chamber and from adjacent a first end of said chamber toward an opposite second end of said chamber;
   means mounted upon said chassis for movement above and between said ends of said chamber and having a terminal end, said movably mounted means being positioned adjacent to said delivering means to as to support said crop material being delivered from adjacent said first end toward said opposite second end of said chamber by said delivering means and to progressively discharge said crop material past its terminal end from said delivering means into said chamber along a longitudinal central portion of said chamber upon movement of said movably mounted means between said ends of said chamber so as to progressively form a stack of crop material in said chamber;
   means mounted adjacent said terminal end of said movably mounted means for movement therewith between said ends of said chamber and operable for continuously spreading said crop material across said chamber upon discharge of said crop material past said terminal end so as to achieve lateral distribution thereof between said ends of said chamber;
   packing means mounted to said chamber so as to extend across said chamber below said terminal end of said movably mounted means and said spreading means and be movable therewith between said ends of said chamber to compact said discharged crop material as said stack is progressively formed in said chamber;
   means coupled to said chamber for continuously moving said packing means, and said movably mounted means and said spreading means therewith, between said ends of said chamber; and
   means operably coupled with said spreading means for selectively rendering said spreading means inoperative, when said compact stack has been substantially formed to a desired height, to allow discharge and compaction of final quantities of said crop material along the longitudinal central portion of said stack and thereby provide said stack with a longitudinally-extending rounded off top.

4. The combination as recited in claim 1, wherein said stack forming means includes:
   a stack forming chamber mounted on said chassis and defining said ends of said stack forming means;
   packing means mounted to said chamber so as to extend across said chamber below said terminal end of said movably mounted means and said spreading means and be movable therewith between said ends of said chamber to compact said discharged crop material in said chamber; and
   means coupled to said chamber for continuously moving said packing means, and said movably mounted means and said spreading means therewith, between said ends of said chamber.

* * * * *